US008754658B1

(12) United States Patent
Miller et al.

(10) Patent No.: US 8,754,658 B1
(45) Date of Patent: Jun. 17, 2014

(54) VARIABLE TRANSMISSION OPTICAL FILTER

(75) Inventors: Timothy N. Miller, San Leandro, CA (US); Kathleen A. Morse, Groveland, CA (US); Kevin William Russell Crispin, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 405 days.

(21) Appl. No.: 13/206,463

(22) Filed: Aug. 9, 2011

Related U.S. Application Data

(63) Continuation-in-part of application No. 12/855,559, filed on Aug. 12, 2010, now Pat. No. 8,314,621.

(60) Provisional application No. 61/234,984, filed on Aug. 18, 2009, provisional application No. 61/373,772, filed on Aug. 13, 2010.

(51) Int. Cl.
*G01R 27/32* (2006.01)

(52) U.S. Cl.
USPC ........... 324/647; 324/76.11; 356/10; 385/140

(58) Field of Classification Search
USPC ............. 324/76.11, 647; 359/857; 422/82.05; 356/10
See application file for complete search history.

(56) References Cited

U.S. PATENT DOCUMENTS

| 2003/0002112 A1* | 1/2003 | Hirano et al. ................. 359/161 |
| 2004/0223881 A1* | 11/2004 | Cunningham et al. ..... 422/82.05 |
| 2009/0059406 A1* | 3/2009 | Powers et al. ................. 359/889 |

FOREIGN PATENT DOCUMENTS

JP          10253450 A    *   9/1998

* cited by examiner

*Primary Examiner* — Vincent Q Nguyen
(74) *Attorney, Agent, or Firm* — McDermott Will & Emery LLP

(57) ABSTRACT

A method for controlling an amplitude of an incoming light is provided. The method includes attenuating a portion of the incoming light within a first band having a tunable peak attenuation wavelength using a tunable filter; passing a portion of the incoming light from the tunable filter within a second band using a fixed filter; and controlling the amplitude of the incoming light by tuning the peak attenuation wavelength of the tunable filter.

16 Claims, 31 Drawing Sheets

2400

```
┌─────────┐
│  Start  │
└─────────┘
     │
     ▼
``` reflecting electromagnetic radiation incident on an electromagnetic radiation facing surface of a matrix body of a unit cell of a narrow band filter and an electromagnetic radiation facing surface of an inclusion body of the unit cell of the narrow band filter, the inclusion body disposed in the matrix body, the matrix body having a first permittivity, the inclusion body having a second permittivity, wherein a bandwidth of the reflected electromagnetic radiation is based on a difference between the first permittivity and a third permittivity, the third permittivity being an average permittivity between the first permittivity and the second permittivity based on a volume of the inclusion body and a volume of a portion of the matrix body, the portion of the matrix body being adjacent to and/or opposite the electromagnetic radiation facing surface of the inclusion body
S2402 adjusting the second permittivity of the inclusion body to adjust the third permittivity, thereby adjusting the difference between the first permittivity and the third permittivity
S2404

```
┌─────────┐
│   End   │
└─────────┘
```

FIG. 24

VARIABLE TRANSMISSION OPTICAL FILTER

CROSS-REFERENCES TO RELATED APPLICATIONS

The present application is a continuation-in-part of U.S. patent application Ser. No. 12/855,559, entitled "NARROW BAND FILTER," filed on Aug. 12, 2010, which claims the benefit of U.S. Provisional Patent Application Ser. No. 61/234,984, entitled "TUNABLE NARROW BAND FILTERS," filed on Aug. 18, 2009, which are hereby incorporated by reference in their entirety for all purposes. The present application also claims the benefit of U.S. Provisional Patent Application Ser. No. 61/373,772, entitled "VARIABLE TRANSMISSION OPTICAL FILTER," filed on Aug. 13, 2010, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to optical filters, and more particularly to variable transmission optical filters for narrowband regions of interest.

BACKGROUND

Narrowband light (e.g., light containing only a small range of wavelengths such as a laser light) in an optical system may be too bright (e.g., high amplitude) for a detector, or may need to be reduced without affecting nearby wavelengths of interest. It is therefore desirable to control the amplitude of the narrowband light.

Conventional methods for controlling the amplitude of a narrowband light involve the use of a fixed filter. Conventional fixed filters comprise a thin-film coating on a glass substrate with some fixed transmission spectrum. Fixed filters, however, require knowledge of the wavelength characteristics of the light of interest in advance of manufacture. Additionally, fixed filters are designed and manufactured for specific wavelengths and are therefore incapable of filtering other wavelengths. Accordingly, when the application requirements or wavelengths of interest change, a replacement fixed filter must be designed and manufactured. Furthermore, the sharpness of the transmission cut-offs and cut-ons (i.e., how sharply the filter switches between high-transmission and low-transmission versus wavelength) may be limited by conventional thin-film coating design constraints. Moreover, thin-film coating designs which use multiple coating layers increase the probability that the fixed filter will suffer from common coating manufacturing errors, which may further limit the actual bandpass of the fixed filter and the sharpness of the cut-ons and cut-offs.

According to another conventional method for controlling the amplitude of the narrowband light, a fixed filter may be made to be a tunable filter by tilting the fixed filter at some angle, thereby shifting its transmission spectrum by a limited amount. This method, however, involves mechanical motion, which decreases reliability of these optical systems due to the presence of moving parts. Since such moving parts are susceptible to failure, there is also some decrease in ruggedness in applying this method. Additionally, this method requires electrical power to activate any motors or solenoids responsible for tilting the fixed filter. Furthermore, tilting of the fixed filter to a desired position inevitably requires some time to accomplish. Finally, the magnitude and direction of the spectrum shift is limited.

According to another conventional method for controlling the amplitude of the narrowband light, a pair of polarizing filters configured to rotate relative to each other may be utilized. This method, however, changes the transmission over a wide waveband with no differentiation between nearby wavelengths. Further, this method also involves moving parts, thereby decreasing the reliability of these systems as described above.

According to another conventional method for controlling the amplitude of the narrowband light, multiple fixed filters may be switched into the path of the incoming light one at a time by the use of some arrangement of filters on a controllable wheel or other filter holder. This method, however, occupies a large amount of volume due to the number of fixed filters required, the hardware necessary to mount and switch the fixed filters, and the extra space required to move the filters around each other. Additionally, the variability in the filter functionality that this method provides is limited by the finite number of individual fixed filters. Furthermore, this method also involves moving parts, thereby decreasing the reliability of these systems as described above. Additionally, this method requires electrical power to activate any motors or solenoids responsible for switching the fixed filters into and out of the incoming light path. Furthermore, such switching to a desired position inevitably requires some time to accomplish.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the subject technology, a filter system is provided. The filter system comprises a tunable filter configured to attenuate via a transmission a portion of an incoming light within a first band having a tunable peak attenuation wavelength; and a fixed filter configured to pass a portion of the incoming light from the tunable filter within a second band.

In accordance with another aspect of the subject technology, a filter system is provided. The filter system comprises a tunable filter configured to attenuate via a reflection a portion of an incoming light within a first band having a tunable peak reflection wavelength; and a fixed filter configured to pass a portion of the incoming light from the tunable filter within a second band.

In accordance with another aspect of the subject technology, a method for controlling an amplitude of an incoming light is provided. The method comprises attenuating a portion of the incoming light within a first band having a tunable peak attenuation wavelength using a tunable filter; passing a portion of the incoming light from the tunable filter within a second band using a fixed filter; and controlling the amplitude of the incoming light by tuning the peak attenuation wavelength of the tunable filter.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 4A illustrates a side view of an example of an electric field distribution in the unit cell while FIG. 4B illustrates a corresponding spectral response simulation, in accordance with various aspects of the subject technology.

FIG. 22A illustrates an example of a polarization independent unit cell configuration for the narrow band filter, while

FIG. 24 illustrates an example of a method, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

According to various aspects of the subject technology, a filter system configured to controllably attenuate a portion of an incoming light with a tunable filter is provided. A peak wavelength of interest of an incoming light may not be known in advance or may change. In some aspects, the filter system may have a tunable peak attenuation wavelength that can be tuned relative to a wavelength of interest to attenuate the wavelength of interest by a controllable amount. In some aspects, the filter system may comprise a tunable filter that is controllable in real time with no moving parts. In some aspects, the filter system may be robust and reliable and compact because the system has no moving parts. In some aspects, because the filter system has no moving parts, the filter system may control the incoming light in a difficult environment (e.g., in a space flight sensor) and may be sufficiently robust to withstand the difficult environment (e.g., to survive the rigors of a launch and space environment). In other aspects, the filter system may be compact and lightweight because the filter system occupies only a small volume in an optical path. In another aspect, the filter system may consume minimal electrical power during operation because the system has no moving parts, motors or actuators. In one aspect of the subject technology, the filter system may comprise a sharp transition, or cut-ons and cut-offs, and may be configured to reduce a main strong wavelength by a controllable amount without reducing nearby wavelengths.

Figure 25:
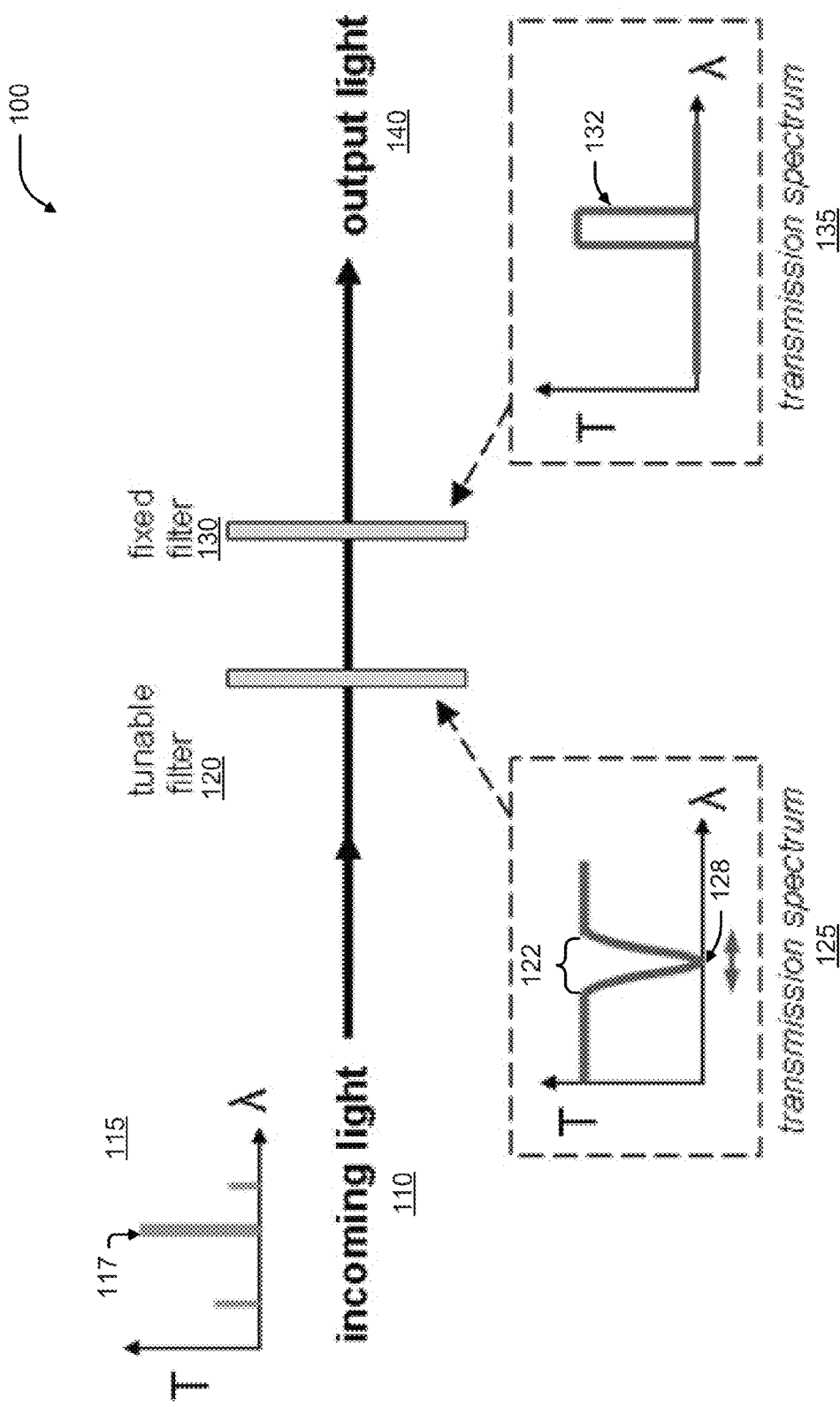
FIG. 25 illustrates a filter system, in accordance with various aspects of the subject technology.

Referring to FIG. 25, in some aspects, a filter system 100 may comprise one or more tunable filters 120 configured to attenuate a portion of an incoming light 110 within a first band 122 having a tunable peak attenuation wavelength 128. That is, the tunable filter 120 may be configured to attenuate the portion of the incoming light 110 within the first band 122 while transmitting all other light. In other aspects, the tunable filter 120 may be configured to attenuate the incoming light 110 by a controllable amount. This may be achieved by moving the peak attenuation wavelength 128 of the tunable filter 120 relative to a wavelength of interest 117 of the incoming light 110.

In some aspects, the first band 122 of the tunable filter 120, has a tunable peak attenuation wavelength 128. In some aspects, the tunable peak attenuation wavelength 128 of the first band 122 of the tunable filter 120 is quickly controllable/tunable in real time without moving parts. In other aspects, the tunable peak attenuation wavelength 128 of the first band 122 of the tunable filter 120 is controllable/tunable in real time by varying a voltage applied to the tunable filter 120. According to certain aspects of the subject technology, the photonic crystal structure and the index of refraction of component materials may determine the bandwidth (e.g., range of wavelengths) of the first band 122. Simulations have shown that the bandwidth can be modulated from 0.2 to 20 nanometers by changing the thickness of a block inclusion, which is one of the components responsible for the index contrast in the photonic crystal. In some aspects, the photonic crystal dimensions may determine the wavelength of the response. In one aspect, the photonic crystal can be integrated into a liquid crystal device to allow for tunability. For example, the effective permittivity of the liquid crystal device may be changed by applying an electric voltage across the liquid crystal. This may result in changing the peak attenuation wavelength 128 of the first band 122 quickly and without moving parts.

In some aspects, the tunable filter 120 may be applied to infrared wavelengths, visible wavelengths, and other suitable wavelengths. Furthermore, the tunable filter 120 can be made to be polarization-independent or polarization-dependent.

In one aspect, the tunable filter 120 maybe based on a two-dimensional photonic crystal class of metamaterials allowing for the patterning of larger feature sizes than allowed by other classes of metamaterials and relaxing some constraints on fabrication tolerances. A suite of commercial electromagnetics (EM) codes may incorporate precisely measured constituent material properties.

Figure 1:
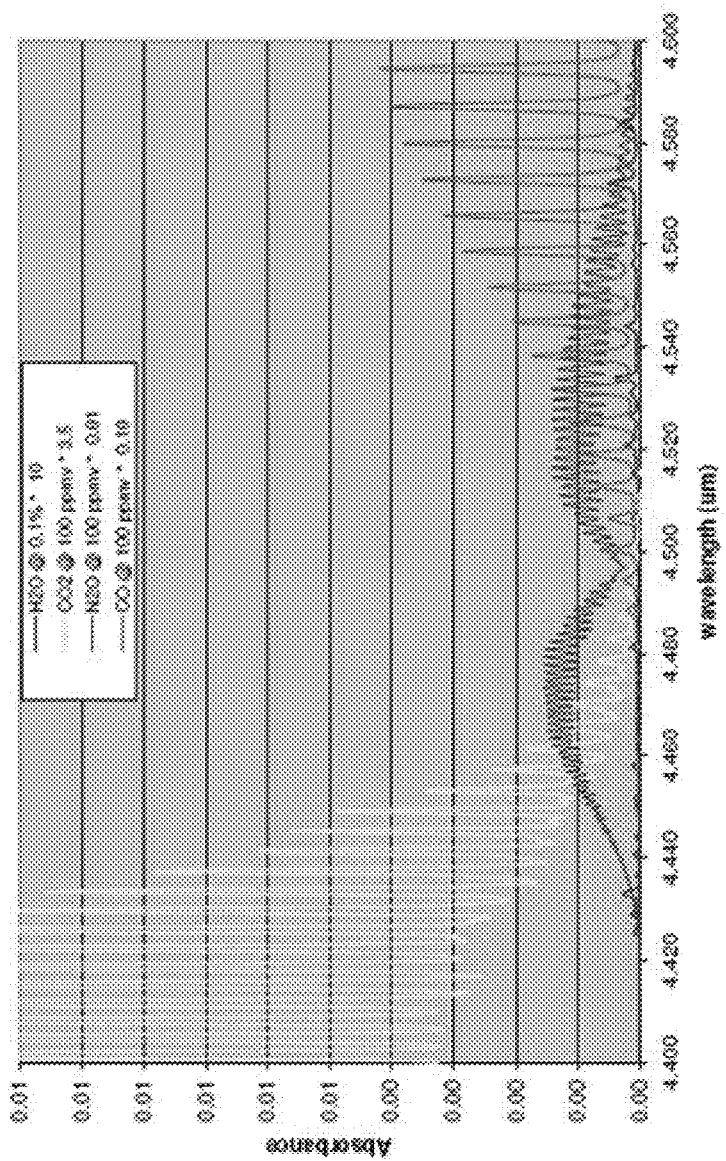
FIG. 1 illustrates an example of a portion of the electromagnetic spectrum that a narrow band filter may be applied to for detecting certain chemical species, in accordance with various aspects of the subject technology.

FIG. 1 illustrates an example of a portion of the electromagnetic spectrum that a narrow band filter may be applied to for detecting certain chemical species, in accordance with various aspects of the subject technology. In some aspects, by tuning or sweeping over limited frequency ranges with a narrow band filter, overlapping chemical species may be detected and quantified. For example, sampling information at a 10 nanometer (nm) bandwidth or less in the mid-infrared region of the electromagnetic spectrum may be beneficial in distinguishing between $N_2O$ and CO and $CO_2$.

Figure 2:
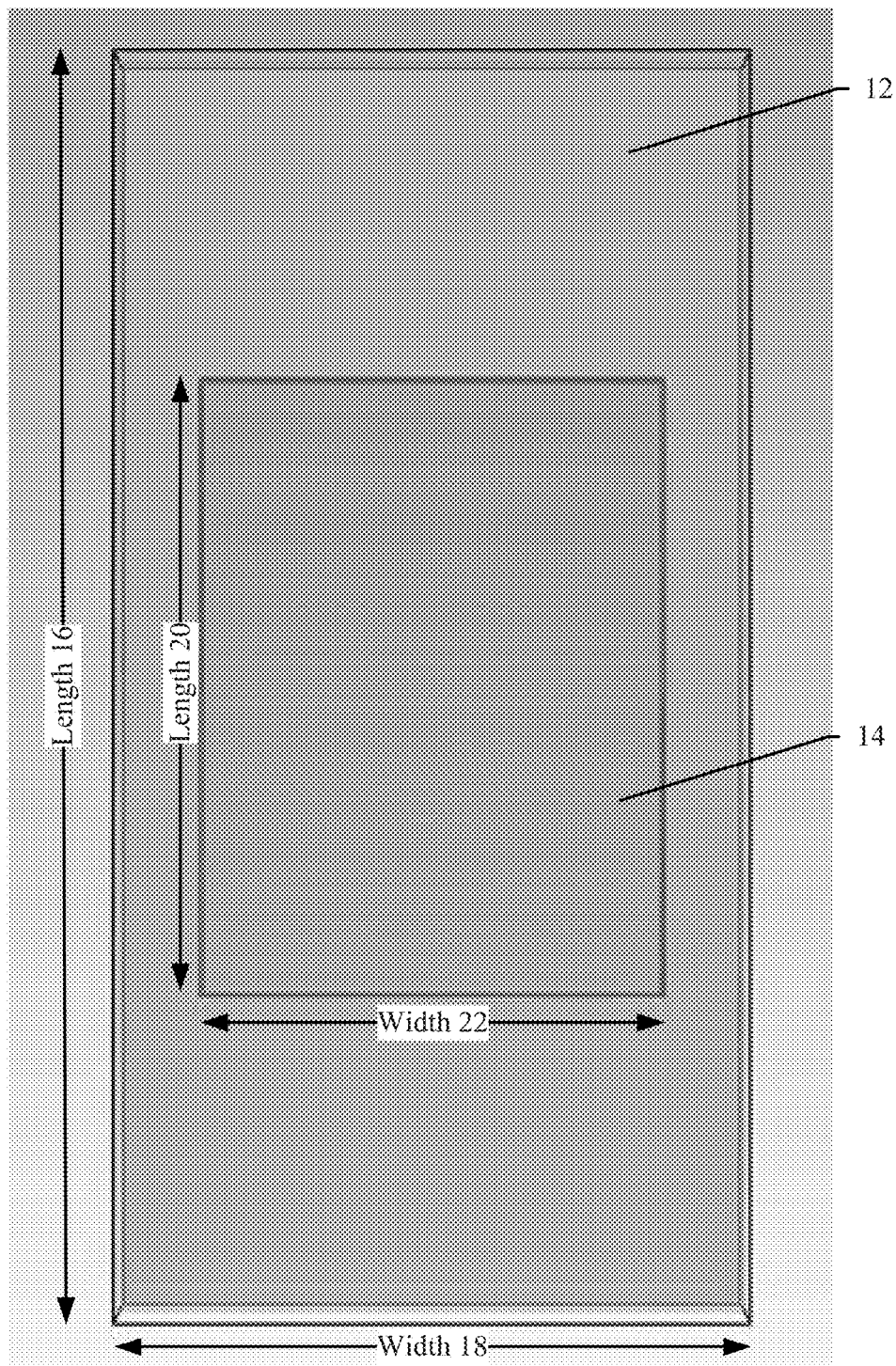
FIG. 2 illustrates an example of a unit cell of a narrow band filter, in accordance with various aspects of the subject technology.

FIG. 2 illustrates an example of a unit cell 10 of a narrow band filter, in accordance with various aspects of the subject technology. Unit cell 10 comprises matrix body 12 having a first permittivity. Unit cell 10 also comprises inclusion body 14 disposed in matrix body 12 and having a second permittivity. An electromagnetic radiation facing surface (ERFS) of matrix body 12 is the surface of matrix body 12 shown in FIG. 2, and the ERFS of inclusion body 14 is the surface of inclusion body 14 shown in FIG. 2. Matrix body 12 and inclusion body 14 are configured to reflect electromagnetic radiation incident on the of matrix body 12 and the ERFS of inclusion body 14. According to various aspects of the subject technology, the second permittivity of inclusion body 14 may be adjusted in order to determine specific ranges of electromagnetic radiation that is reflected by unit cell 10, thereby enabling unit cell 10 to operate as a filter of electromagnetic radiation. For example, in some aspects, a bandwidth of the reflected electromagnetic radiation is based on a difference between the first permittivity and a third permittivity. The third permittivity may be an average permittivity between the first permittivity and the second permittivity based on a volume of inclusion body 14 and a volume of a portion of matrix body 12. For example, if the volume of inclusion body 14 were equal to the volume of the portion of matrix body 12, then the third permittivity may simply be the average permittivity between the first permittivity and the second permittivity. In some aspects, the third permittivity may be defined by the rule of mixtures of permittivity of inclusion body 14 and the portion of matrix body 12.

In some aspects, the portion of matrix body 12 is adjacent to and/or opposite the ERFS of inclusion body 14 (e.g., the portion of matrix body 12 behind and/or in front of inclusion body 14 in which electromagnetic radiation may be transmitted through in addition to being transmitted through inclusion body 14). In some aspects, being adjacent to inclusion body 14 does not necessarily mean that the portion of matrix body 12 is in direct contact with inclusion body 14, but may also mean other structures may be between inclusion body 14 and the portion of matrix body 12. According to certain aspects, inclusion body 14 is configured such that the second permittivity is adjustable to adjust the third permittivity, thereby adjusting the difference between the first permittivity and the third permittivity. In this regard, the bandwidth of the reflected electromagnetic radiation may be adjusted by adjusting the second permittivity and/or the third permittivity.

In some aspects, unit cell 10 may be referred to as a photonic unit cell, which may be repeated in two dimensions (e.g., along a plane of the ERFS of matrix body 12 and the ERFS of inclusion body 14). In some aspects, electromagnetics modeling tools may be used to down-select materials for matrix body 12 and/or inclusion body 14 and define fabrication tolerances for optimum filter performance. Simulations show that filter performance may be sensitive to material loss. In some aspects, for optimum performance, matrix body 12 uses a loss of better than $2.5 \times 10^{-5}$. In some aspects, matrix body 12 may be referred to as a host. In some aspects, matrix body 12 may comprise at least one of zinc selenide (ZnSe) or zinc sulfide (ZnS). For example, absorption calorimetry of sputtered deposited ZnSe films indicates the upper bounds for loss is $6.5 \times 10^{-6}$ at a 1.064 micron thickness, making this an optimum thin film material to be integrated into the narrow band filter.

In some aspects, inclusion body 14 may be referred to as a block. In some aspects, inclusion body 14 may comprise at least one of silicon dioxide, aluminum oxide, and other suitable materials with sufficiently low absorption values. In some aspects, inclusion body 14 may comprise a liquid crystal material. The liquid crystal material may have a loss value of $1\times10^{-6}$ and may be invariant even with changes in the second permittivity, making it an ideal material for the narrow band filter. Absorption calorimetry may be used to evaluate optimum materials for the narrow band filter.

According to various aspects of the subject technology, the dimensions of unit cell 10 may determine the range of frequencies at which the electromagnetic radiation is reflected. In some aspects, inclusion body 14 is disposed within a cavity of matrix body 12. In some aspects, the ERFS of inclusion body 14 is aligned with the ERFS of matrix body 12. In some aspects, the length 20 and width 22 of the ERFS of inclusion body 14 and the length 16 and width 18 ERFS of matrix body 12 may be varied to determine the range of frequencies at which the electromagnetic radiation is reflected.

Figure 3B:
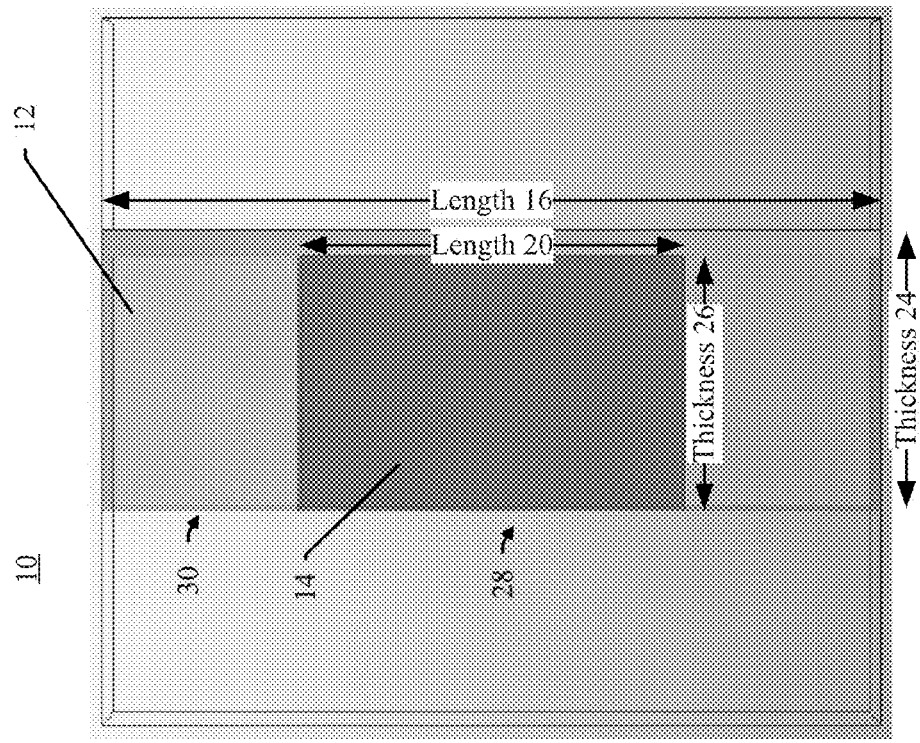
FIGS. 3A and 3B illustrate side views of a unit cell, in accordance with various aspects of the subject technology.
Figure 3A:
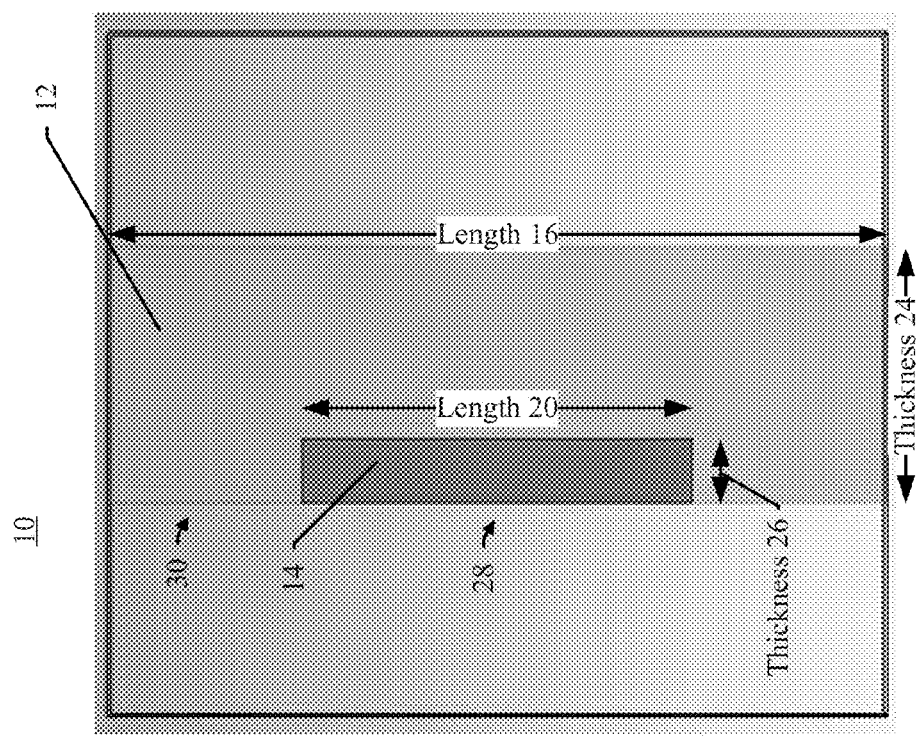

For example, the reflected electromagnetic radiation may be within an infrared portion of the electromagnetic spectrum. Thus, an average length 20 of the ERFS of inclusion body 14 may be between about 1.52 microns and about 1.77 microns. An average width 22 of the ERFS of inclusion body 14 may be between about 1.14 microns and about 1.52 microns. In some aspects, an average length 16 of the ERFS of matrix body 12 may be between about 3.04 microns and about 3.54 microns. An average width 18 of the ERFS of matrix body 12 may be between about 1.52 microns and about 2.02 microns. FIGS. 3A and 3B illustrate side views of unit cell 10, in accordance with various aspects of the subject technology. An average thickness 26 of inclusion body 14 as measured along an axis perpendicular to ERFS 28 of inclusion body 14 may be between about 250 nm and about 1 micron. An average thickness of matrix body 12 as measured along an axis perpendicular to ERFS 30 of matrix body 12 may be about 1 micron. Unit cell 10, however, is not limited to these dimensions. Unit cell 10 may use other suitable dimensions known to those of ordinary skill in the art depending on a desired range of frequencies at which the electromagnetic radiation is reflected.

Figures 4A, 4B:
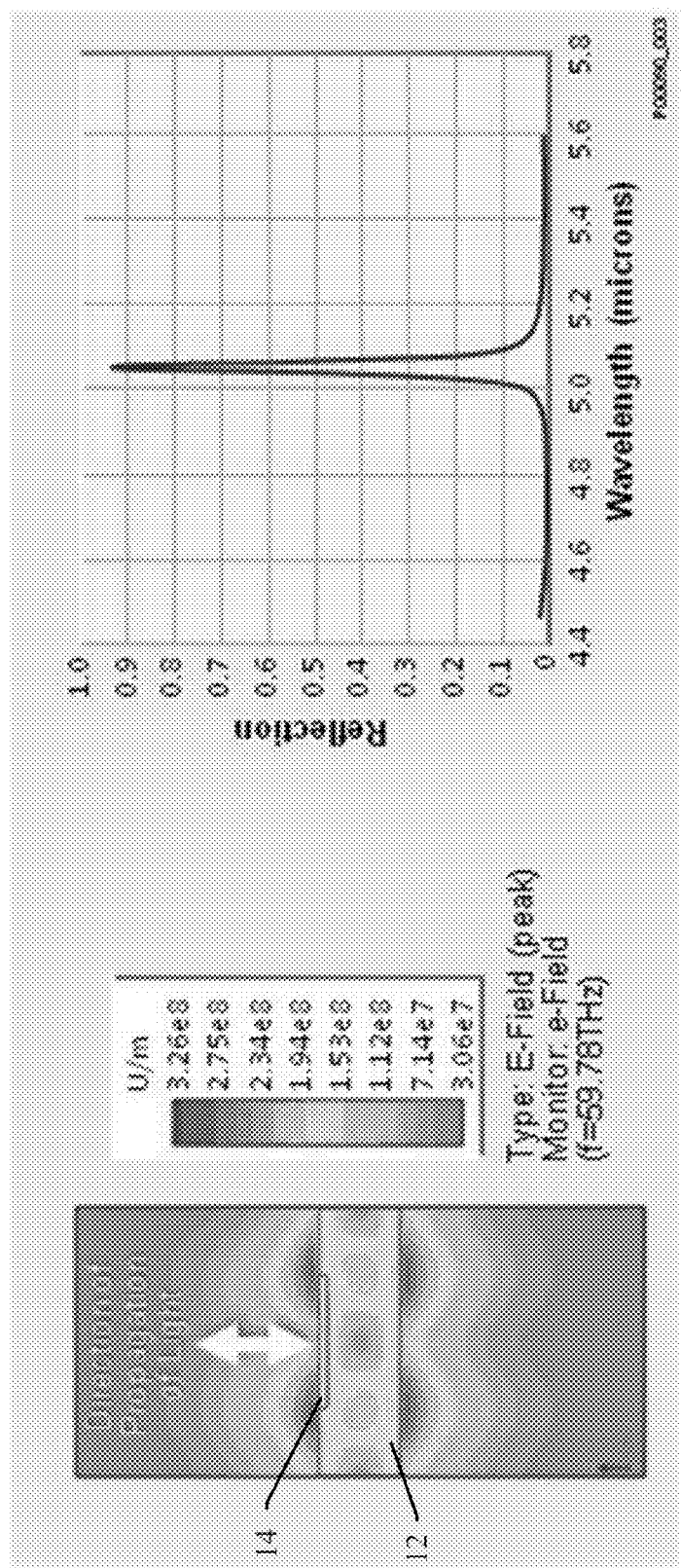

FIG. 4A illustrates a side view of an example of an electric field distribution in unit cell 10 and FIG. 4B illustrates a corresponding spectral response simulation, in accordance with various aspects of the subject technology. In some aspects, an ultra-narrow band reflection response of the narrow band filter relies on the narrow band reflection of electromagnetic radiation of unit cell 10. The narrow band reflection may rely on guided-mode resonance in which the externally propagating diffracted fields are coupled to the waveguide modes of unit cell 10. Such resonances may be strongly confined within unit cell 10, and period contrast of permittivity grating may provide phase matching mechanisms that allow these modes to couple into radiation modes and possess a finite lifetime. Near the resonance frequency, Fano interference may occur and result in complete reflection.

Figure 5:
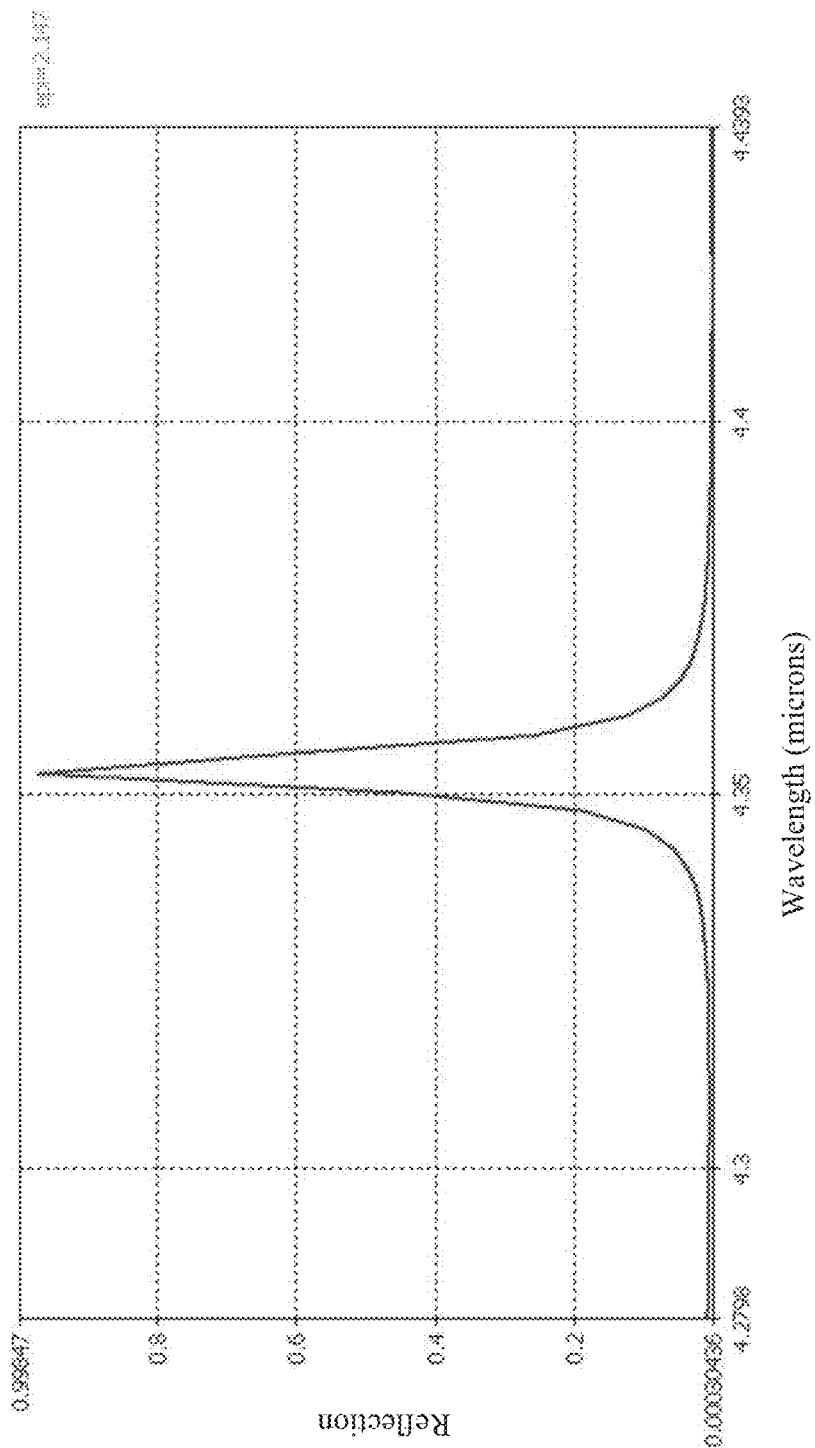
FIG. 5 illustrates an example of a spectral response of the narrow band filter, in accordance with various aspects of the subject technology.
Figure 6:
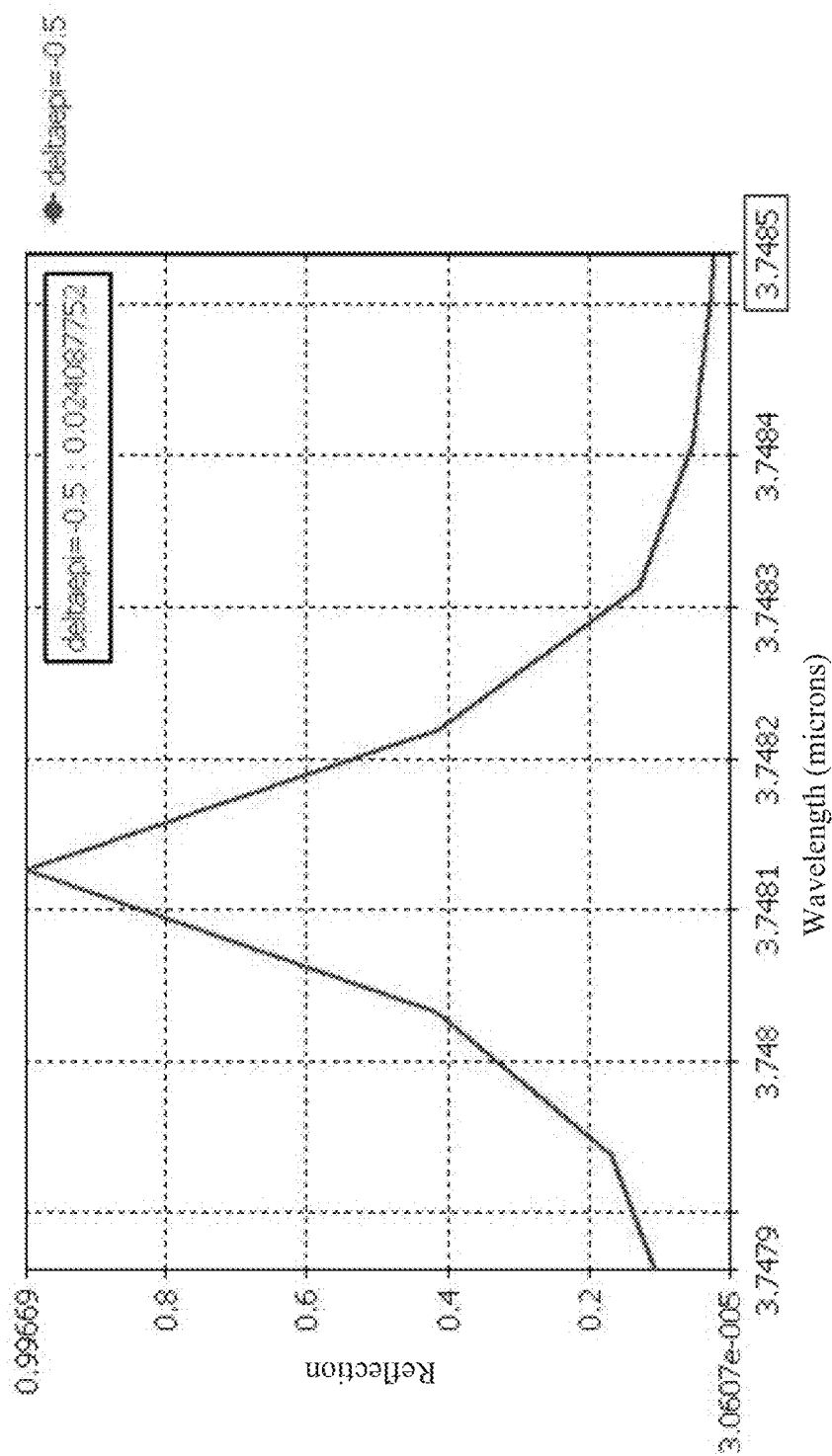
FIG. 6 illustrates an example of a spectral response of the narrow band filter, accordance with various aspects of the subject technology.

Referring to FIG. 4B, roll-off behavior of the spectral response may be controlled by a thickness of unit cell 10. In some aspects, the spacing between multiple unit cells of the narrow band filter may be used as a way to control filter roll-off. FIG. 5 illustrates an example of a spectral response of the narrow band filter, in accordance with various aspects of the subject technology. As shown, the bandwidth of the reflected electromagnetic radiation at full width at half-maximum (FWHM) is 10 nm. However, unit cell 10 of the narrow band filter may reflect electromagnetic radiation at other suitable bandwidths, such as between 2 Angstroms and 20 nm. In some aspects, a narrow bandwidth may refer to bandwidths between 2 Angstroms and 20 nm. In some aspects, a narrow bandwidth may refer to bandwidths greater than 20 nm. In some aspects, a narrow bandwidth may refer to bandwidths less than 2 Angstroms. FIG. 6 illustrates an example of a spectral response of the narrow band filter, in accordance with various aspects of the subject technology. In this example, the bandwidth of the reflected electromagnetic radiation at FWHM is 2 Angstroms. In this case, an average thickness of inclusion body 14 is 1 nm and an average thickness of matrix body 12 is 1 micron. The permittivity contrast (e.g., the difference between the first permittivity and the second permittivity) is indicated by "deltaepi," which in this example is −0.5.

As noted above, the second permittivity of inclusion body 14 may be adjusted to adjust the third permittivity in order to determine specific ranges of electromagnetic radiation that is reflected by unit cell 10, thereby enabling unit cell 10 to operate as a filter of electromagnetic radiation. For example, in some aspects, a bandwidth of the reflected electromagnetic radiation is based on a difference between the first permittivity and the third permittivity. As discussed above, the third permittivity can be found using the rule of mixtures of permittivity. This approach may result in small permittivity contrasts between inclusion body 14 and matrix body 12.

Figure 7:
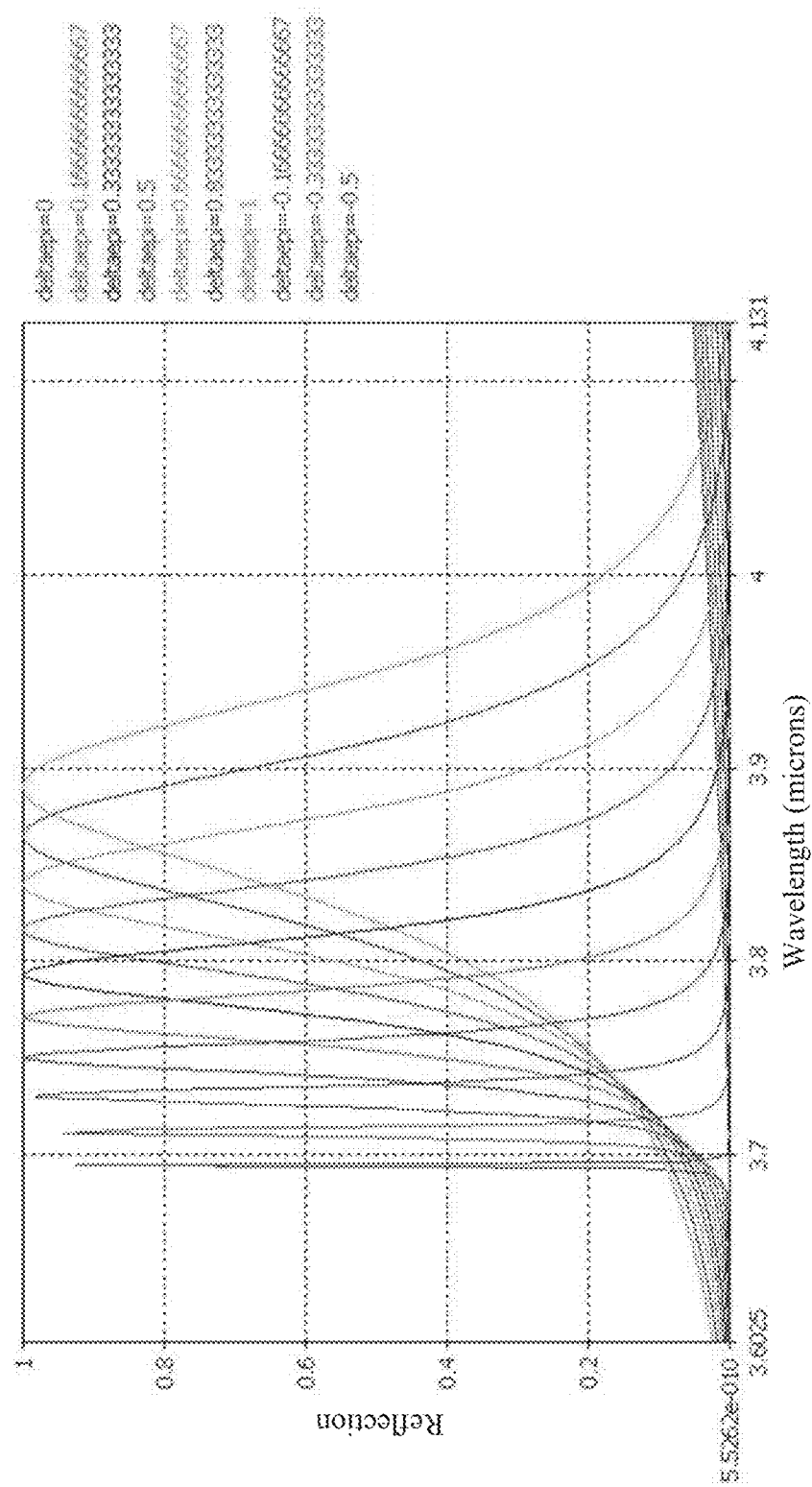
FIGS. 7 and 8 illustrate examples of the spectral responses of the reflected electromagnetic radiation of the unit cell, in accordance with various aspects of the subject technology.
Figure 8:
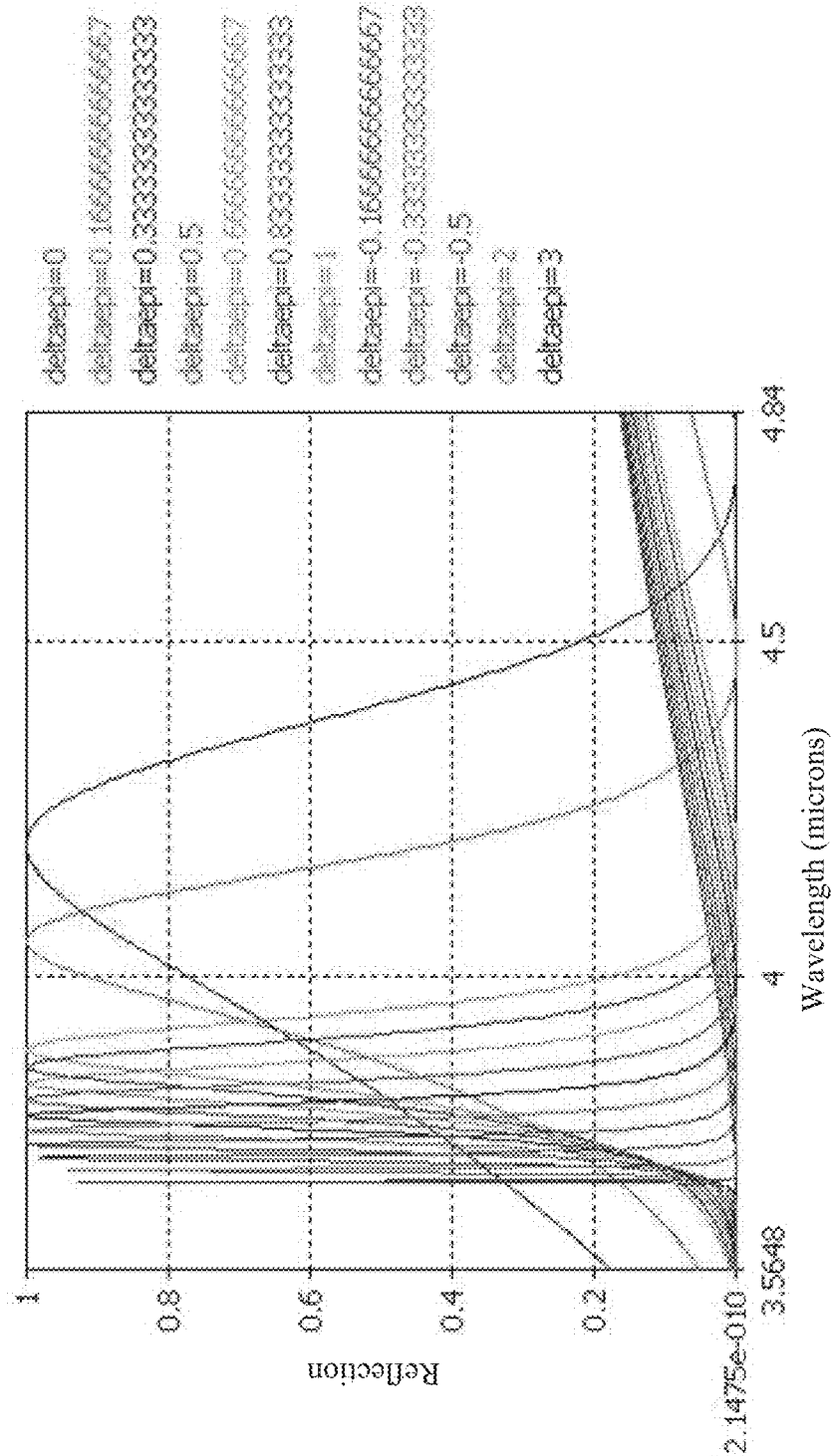

FIGS. 7 and 8 illustrate examples of the spectral responses of the reflected electromagnetic radiation of unit cell 10, in accordance with various aspects of the subject technology. In these examples, the first permittivity (e.g., the permittivity of matrix body 12) is set at an initial value of 3.9, while the second permittivity (e.g., the permittivity of inclusion body 14) is set at an initial value of 2.6. A permittivity contrast value, "deltaepi," is varied and added to the first permittivity while it is subtracted from the second permittivity. Thus, the larger the value of deltaepi, the greater the difference between the first permittivity and the second permittivity (resulting in a greater difference between the first permittivity and the third permittivity). As shown in FIGS. 7 and 8, the smaller the permittivity contrast of the first permittivity and the second permittivity (resulting in a smaller permittivity contrast between the first permittivity and the third permittivity), the narrower the bandwidth of the reflected electromagnetic radiation. Correspondingly, the greater the permittivity contrast of the first permittivity and the second permittivity (resulting in a greater permittivity contrast between the first permittivity and the third permittivity), the broader the bandwidth of the reflected electromagnetic radiation.

According to various aspects of the subject technology, inclusion body 14 is configured such that the second permittivity is adjustable to adjust the third permittivity, thereby adjusting the difference between the first permittivity and the third permittivity. In some aspects, by adjusting the thickness of inclusion body 14 relative to the thickness of matrix body 12, the second permittivity may be adjusted to adjust the third permittivity, thereby adjusting the difference between the first permittivity and the third permittivity. In some aspects, simulations show that as the thickness of inclusion body 14 decreases, the permittivity contrast of the first permittivity and the third permittivity decreases, thereby resulting in narrowing of the bandwidth of the reflected electromagnetic radiation.

Thus, the difference between the first permittivity and the third permittivity is based on a thickness of inclusion body 14 relative to a thickness of matrix body 12. The difference between the first permittivity and the third permittivity is decreased if the thickness of inclusion body 14 is decreased relative to the thickness of matrix body 12, thereby resulting in narrowing the bandwidth of the reflected electromagnetic radiation. The difference between the first permittivity and the third permittivity is increased if the thickness of inclusion body 14 is increased relative to the thickness of matrix body 12, thereby resulting in broadening the bandwidth of the reflected electromagnetic radiation.

Figure 9:
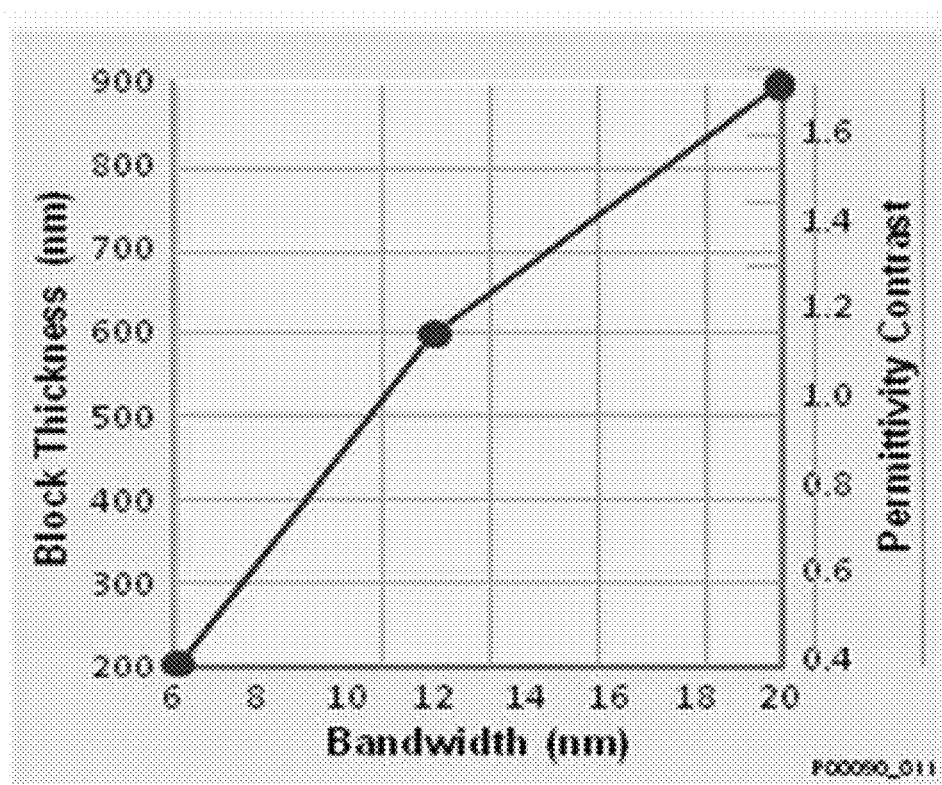
FIG. 9 illustrates an example of a relationship between a thickness of an inclusion body of the unit cell, permittivity contrast of the unit cell, and a bandwidth of the reflected electromagnetic radiation of the unit cell, in accordance with various aspects of the subject technology.

FIG. 9 illustrates an example of a relationship between a thickness of inclusion body 14, permittivity contrast between the first permittivity and the third permittivity, and a bandwidth of the reflected electromagnetic radiation of unit cell 10, in accordance with various aspects of the subject technology. In some aspects, the bandwidth of reflected electromagnetic radiation depends on the permittivity contrast between the first permittivity and the third permittivity, and the amplitude of this contrast may be directly proportional to the bandwidth of the reflected electromagnetic radiation.

Figure 10:
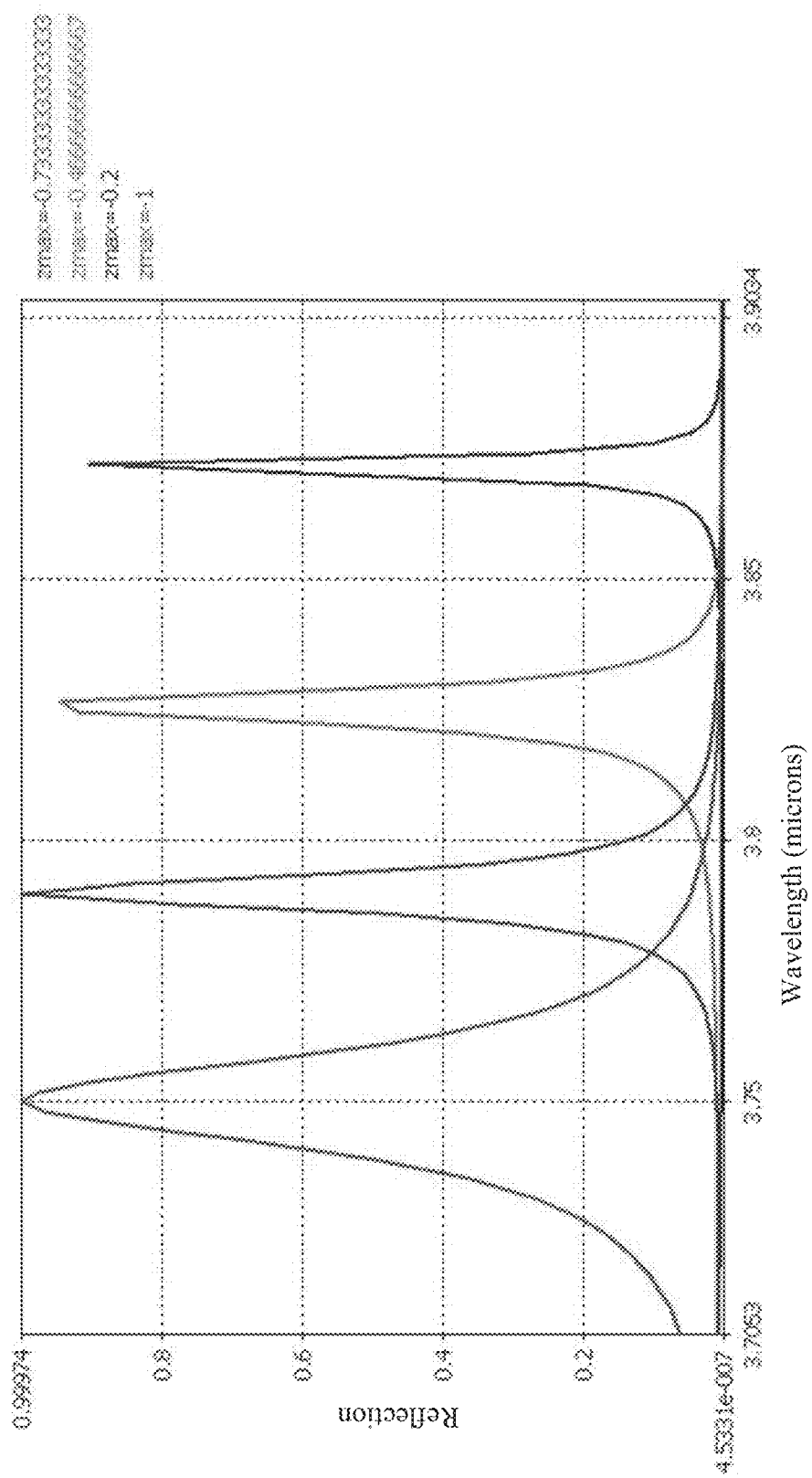
FIG. 10 illustrates examples of the spectral response of the reflected electromagnetic radiation of the unit cell, in accordance with various aspects of the subject technology.

FIG. 10 illustrates examples of the spectral response of the reflected electromagnetic radiation of unit cell 10, in accordance with various aspects of the subject technology. The thickness of inclusion body 14 is indicated by "zmax," with units in microns. In these examples, the thickness of matrix body 12 is 1 micron. As shown in FIG. 10, as the thickness of inclusion body 14 decreases, the bandwidth of the reflected electromagnetic radiation becomes narrower.

Figure 11:
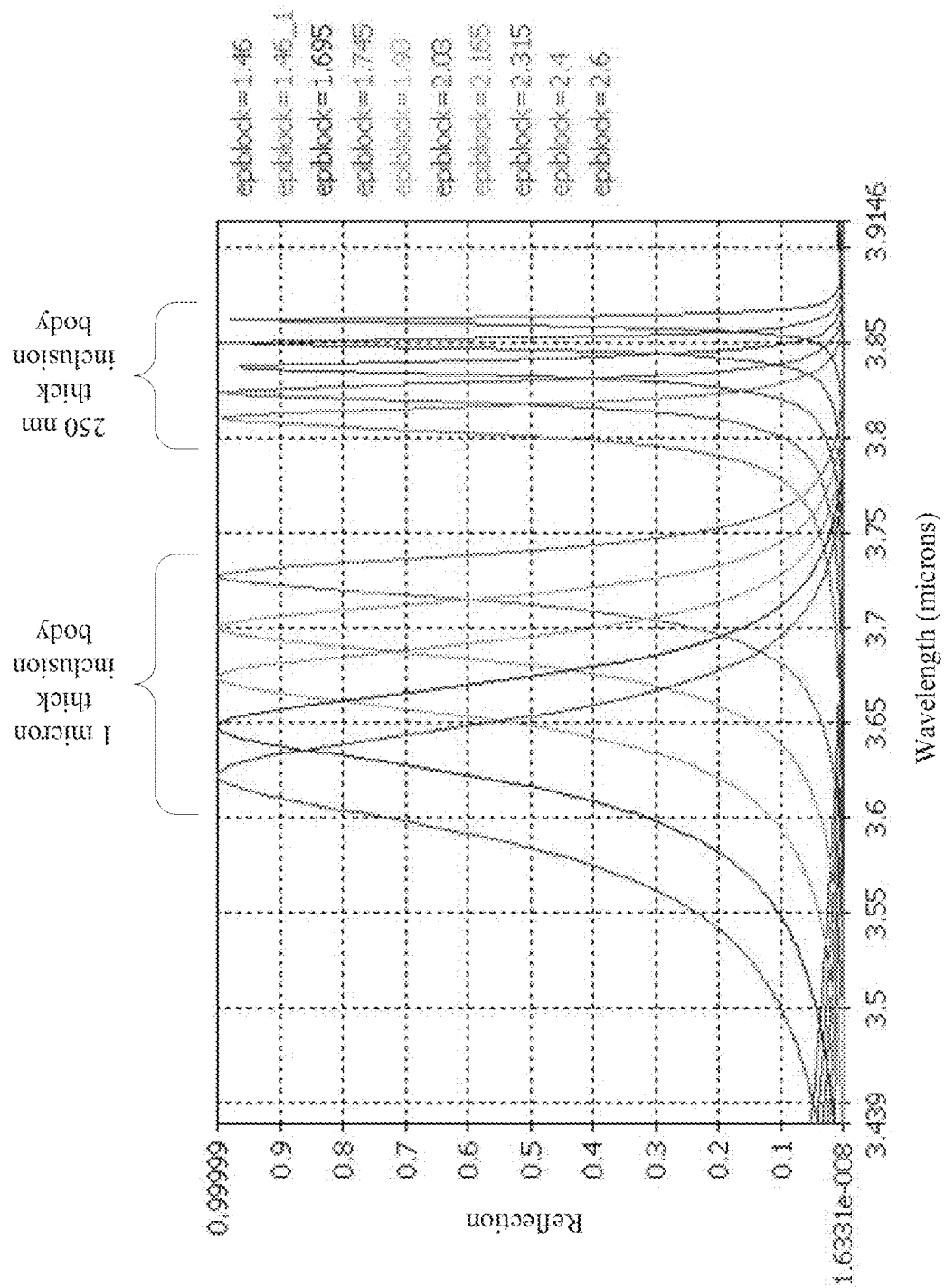
FIG. 11 illustrates examples of the spectral response of the reflected electromagnetic radiation of the unit cell, in accordance with various aspects of the subject technology.

FIG. 11 illustrates examples of the spectral response of the reflected electromagnetic radiation of unit cell 10, in accordance with various aspects of the subject technology. In these examples, length 20 of inclusion body 14 is 1.52 microns, width 22 of inclusion body 14 is 1.14 microns, length 16 of matrix body 12 is 3.04 microns, and width 18 of matrix body 12 is 1.52 microns. As shown in FIG. 11, thickness 26 of inclusion body 14 at 1 micron results in a broader bandwidth of the reflected electromagnetic radiation compared to the bandwidth of the reflected electromagnetic radiation when thickness 26 of inclusion body 14 is 250 nm. Furthermore, the second permittivity of inclusion body 14 is indicated by "epiblock." As shown in FIG. 11, by varying the second permittivity to vary the third permittivity, the bandwidth of the reflected electromagnetic radiation is also adjusted accordingly.

Figure 12:
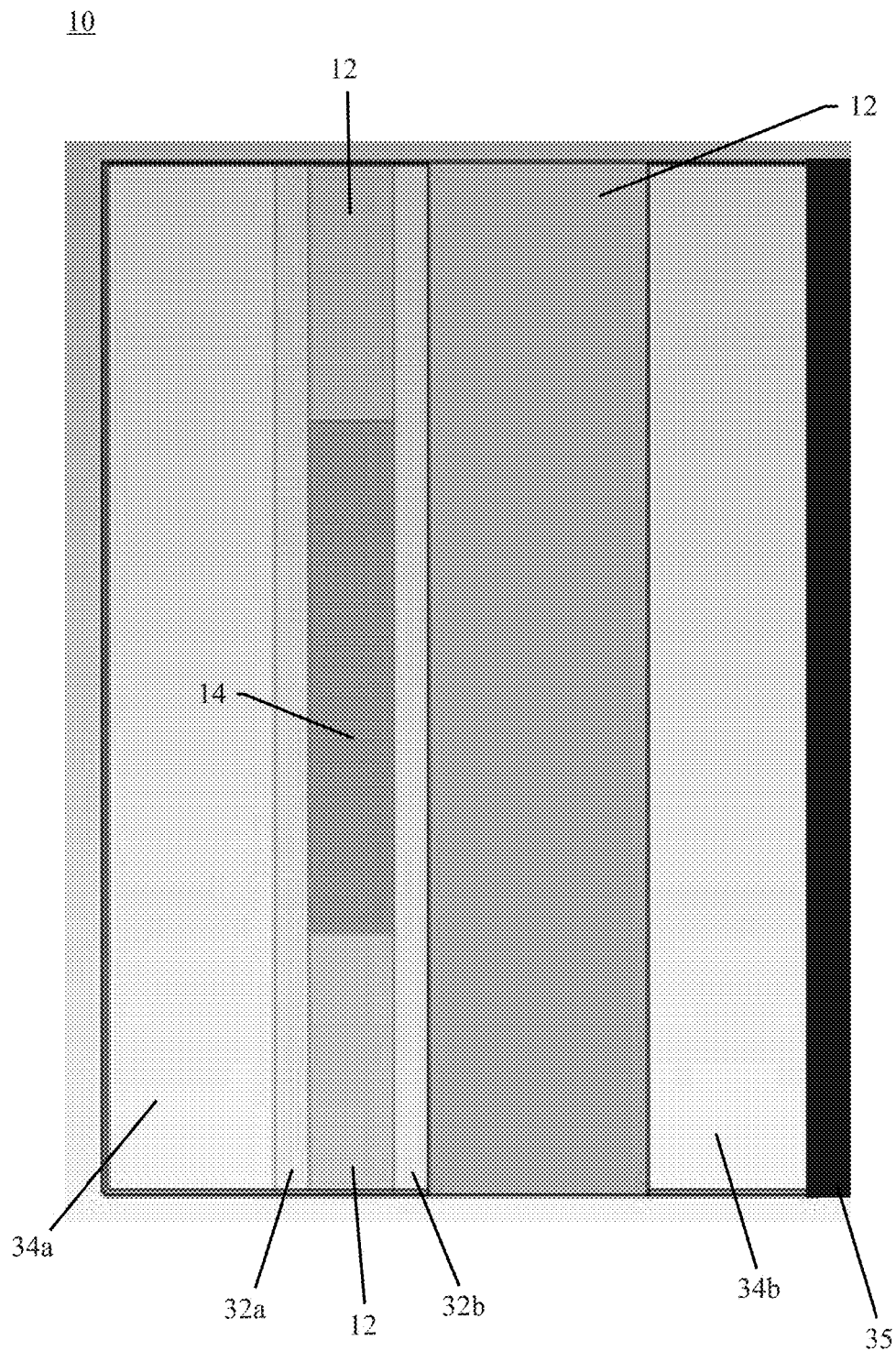
FIG. 12 illustrates a side view of the unit cell, in accordance with various aspects of the subject technology.

According to various aspects of the subject technology, the second permittivity of unit cell 10 may be adjusted (thereby adjusting the third permittivity) by applying a voltage difference across inclusion body 14. The second permittivity may be a function of the amplitude of the voltage applied across inclusion body 14. FIG. 12 illustrates a side view of unit cell 10, in accordance with various aspects of the subject technology. Unit cell 10 comprises electrodes 32a and 32b. Inclusion body 14 is disposed between electrodes 32a and 32b. In some aspects, inclusion body 14 comprises a liquid crystal. In some aspects, the second permittivity is based on an amount of voltage (e.g., amplitude of voltage) applied across inclusion body 14 with electrodes 32a and 32b. For example, a 1 kilohertz alternating current (AC) square wave bias may be applied across inclusion body 14. In some aspects, electrodes 32a and 32b are transparent and are mid-wave infrared electrodes. However, electrodes 32a and 32b may be other suitable electrodes known to those of ordinary skill in the art.

According to certain aspects, the third permittivity may be decreased if the amount of voltage applied across inclusion body 14 with electrodes 32a and 32b is increased. In one example, the first permittivity may be greater than the third permittivity when no voltage is applied across inclusion body 14. Thus, the difference between the first permittivity and the third permittivity may be increased if the amount of voltage applied across inclusion body 14 with electrodes 32a and 32b is increased, thereby resulting in broadening the bandwidth of the reflected electromagnetic radiation. The difference between the first permittivity and the third permittivity may be decreased if the amount of voltage applied across inclusion body 14 with electrodes 32a and 32b is decreased, thereby resulting in narrowing the bandwidth of the reflected electromagnetic radiation. Although the first permittivity is greater than the third permittivity when no voltage is applied across inclusion body 14 in this example, other suitable configurations may be used (e.g., the first permittivity may be equal or may be less than the third permittivity when no voltage is applied).

In some aspects, unit cell 10 comprises substrates 34a and 34b to support the structure of unit cell 10. Electrodes 32a and 32b, inclusion body 14, and the matrix body 12 are disposed between substrates 34a and 34b. In some aspects, substrates 34a and 34b are transparent. In some aspects, substrates 34a and 34b comprise germanium, ZnSe, ZnS, or other suitable transmissive material, in some aspects, unit cell 10 comprises absorber coating 35 coupled to substrate 34b. Absorber coating 35 may be used to avoid extraneous reflection from a backside of unit cell 10 and absorb transmitted electromagnetic radiation.

Figure 13:
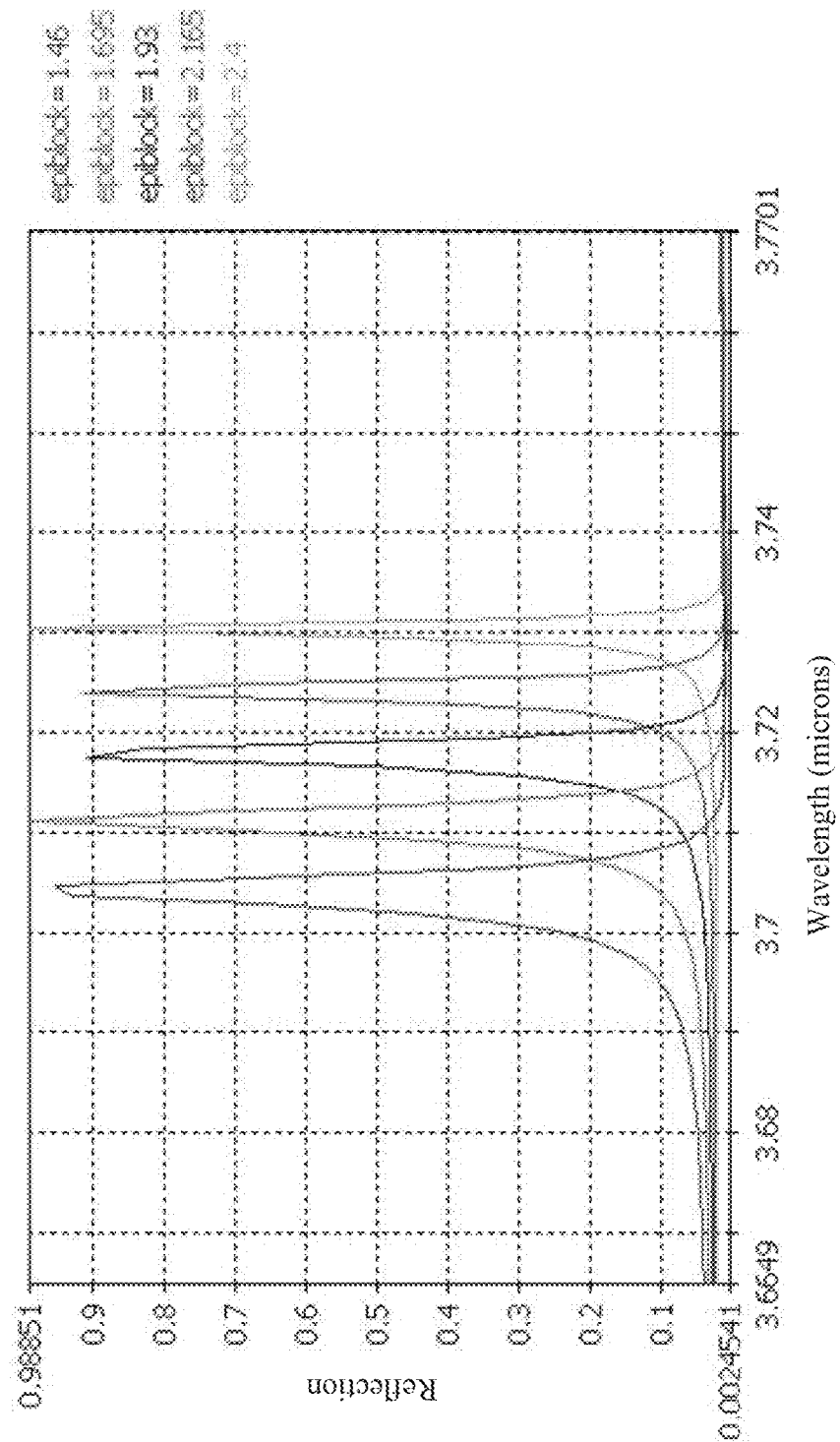
FIGS. 13 and 14 illustrate examples of the spectral response of the reflected electromagnetic radiation of the unit cell, in accordance with various aspects of the subject technology.
Figure 14:
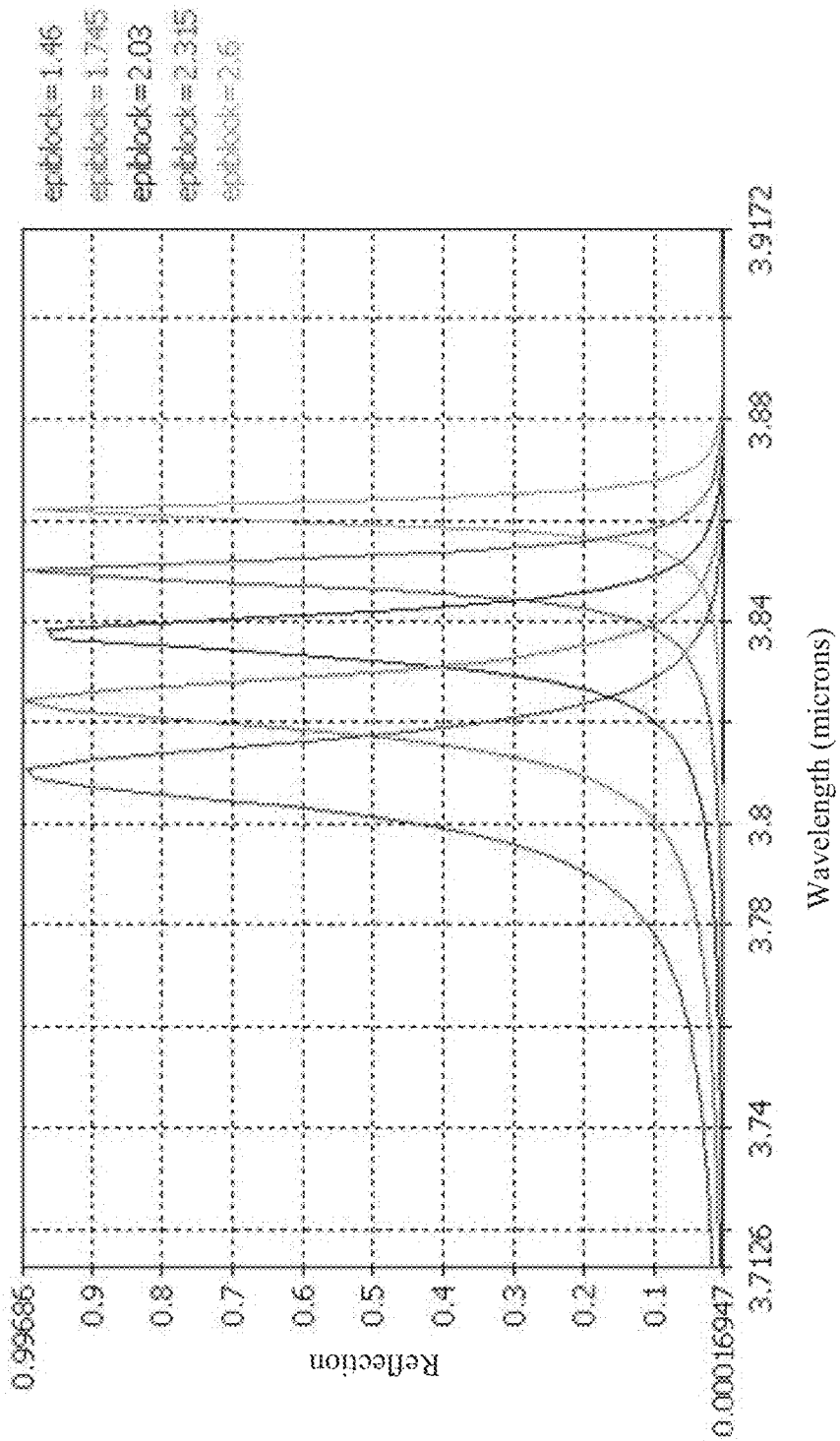

FIGS. 13 and 14 illustrate examples of the spectral response of the reflected electromagnetic radiation of unit cell 10, in accordance with various aspects of the subject technology. As shown in these figures, the bandwidth of the reflected electromagnetic radiation is adjusted depending on the value of the second permittivity, as indicated by epiblock. In an example where the first permittivity is greater than the second permittivity when no voltage is applied across inclusion body 14, as the second permittivity obtains a higher value (the third permittivity also obtains a higher value), the permittivity contrast between the first permittivity and the third permittivity is decreased, thereby resulting in narrowing the bandwidth of the reflected electromagnetic radiation.

According to various aspects of the subject technology, a center of wavelength of the reflected electromagnetic radiation of unit cell 10 may also be adjusted or tuned. In some aspects, a liquid crystal may be placed in front of ERFS 28 of inclusion body 14 and ERFS 30 of matrix body 12. In some aspects, the effective permittivity of this liquid crystal may be modulated by applying a voltage across it. Thus, the wavelength at which Fano interference occurs is also shifted, thereby shifting the center of wavelength of the reflected electromagnetic radiation. For example, unit cell 10 may be made to resonate in the 2 to 7 micron range and beyond.

Figure 15:
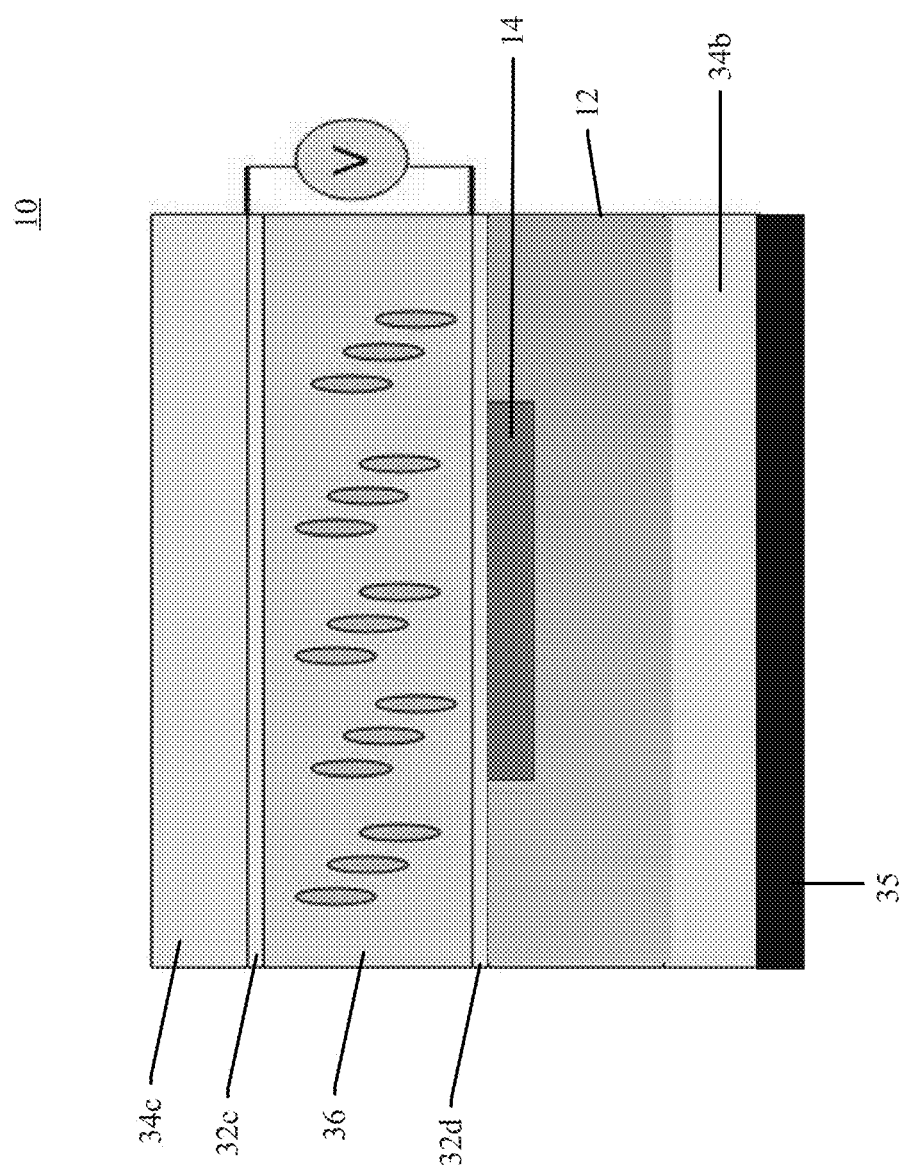
FIG. 15 illustrates an example of the unit cell configured such that the center of wavelength of reflection may be adjusted, in accordance with various aspects of the subject technology.

FIG. 15 illustrates an example of unit cell 10 configured such that the center of wavelength of reflection may be adjusted, in accordance with various aspects of the subject technology. Unit cell 10 comprises liquid crystal 36 coupled to matrix body 12 and inclusion body 14. Liquid crystal 36, for example, may be a 1 micron thick layer of liquid crystal material. However, liquid crystal 36 may be configured in other suitable sizes known to those of ordinary skill in the art. Unit cell 10 also comprises electrodes 32c and 32d. Liquid crystal 36 is disposed between electrodes 32c and 32d. In some aspects, electrodes 32c and 32d are transparent and are mid-wave infrared electrodes. However, electrodes 32a and 32b may be other suitable electrodes known to those of ordinary skill in the art. In some aspects, unit cell 10 comprises absorber coating 35 coupled to substrate 34b. Absorber coating 35 may be used to avoid extraneous reflection from a backside of unit cell 10 and absorb transmitted electromagnetic radiation.

In some aspects, the center of wavelength of the reflected electromagnetic radiation is based on the effective permittivity of liquid crystal 36, which is based on an amount of voltage (e.g., amplitude of voltage) applied across liquid crystal 36 with electrodes 32c and 32d. For example, a 1 kilohertz square wave may be applied across liquid crystal 36, having an amplitude which may be adjusted (e.g., from 0.1 volts to 10 volts) to adjust the amount of voltage applied across liquid crystal 36. In some aspects, the center of wavelength of the reflected electromagnetic radiation is increased if the effective permittivity of liquid crystal 36 is increased (which can be achieved by decreasing the amount of voltage applied across liquid crystal 36 with electrodes 32c and 32d). In some aspects, the center of wavelength of the reflected electromagnetic radiation is decreased if the effective permittivity of liquid crystal 36 is decreased (which can be achieved by increasing the amount of voltage applied across liquid crystal 36 with electrode 32c and 32d).

In some aspects, unit cell 10 further comprises substrate 34c to support the structure of unit cell 10. Electrodes 32c and 32d, liquid crystal 36, inclusion body 14, and matrix body 12 are disposed between substrates 34c and 34b. In some aspects, substrate 34c is transparent. In some aspects, substrates 34c comprises germanium, ZnSe, ZnS, or other suitable transmissive material.

Figure 16:
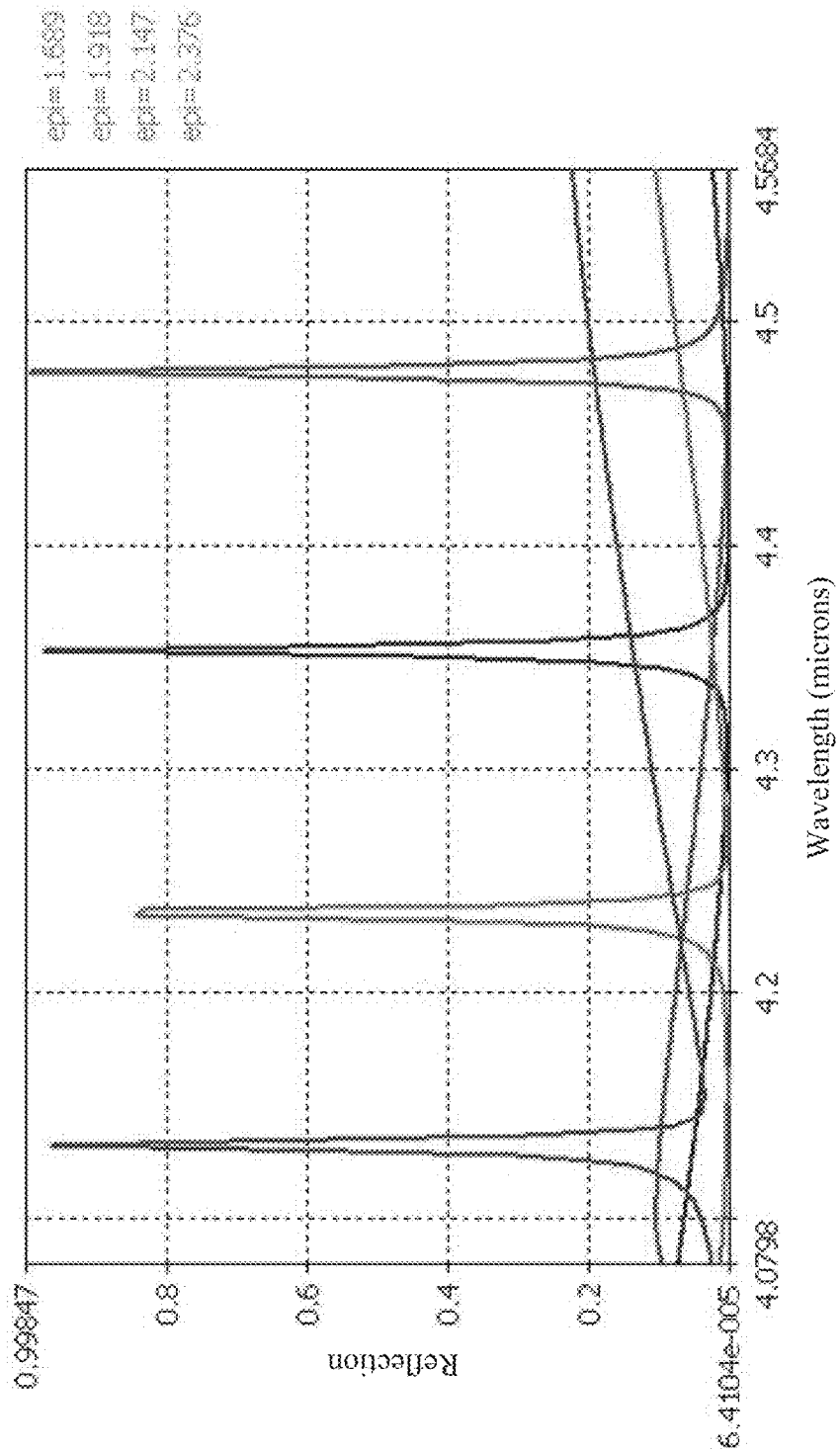
FIGS. 16 and 17 illustrate examples of the spectral response of the reflected electromagnetic radiation of the unit cell, in accordance with various aspects of the subject technology.
Figure 17:
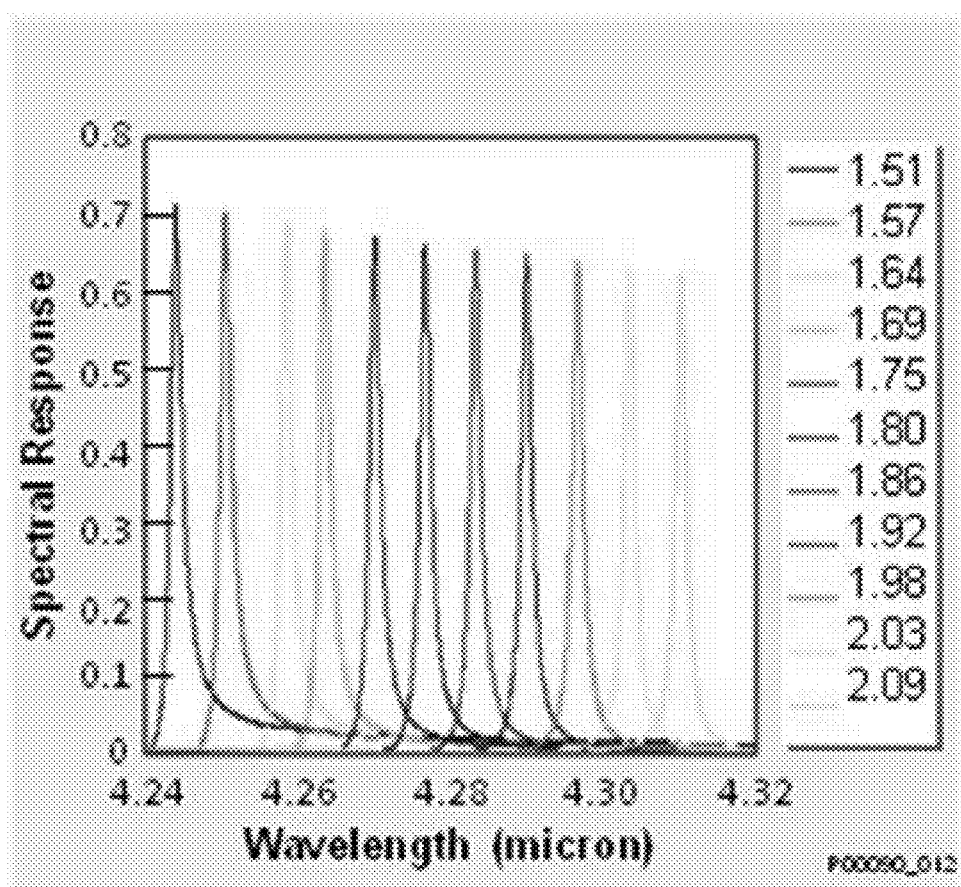

FIGS. 16 and 17 illustrate examples of the spectral response of the reflected electromagnetic radiation of unit cell 10, in accordance with various aspects of the subject technology. As shown in these figures, the center of wavelength of the reflected electromagnetic radiation increases as the permittivity of liquid crystal 36 is increased. In FIG. 16, the permittivity of liquid crystal 36 is indicated by the values of "epi," with each increasing value of epi corresponding to an increasing center of wavelength of the reflected electromagnetic radiation. In FIG. 17, the permittivity of liquid crystal 36 is indicated by values shown to the right of the graph.

In some aspects, the center of wavelength of the reflected electromagnetic radiation may be adjusted by other suitable means. For example, the center of wavelength may be adjusted by adjusting the dimensions of unit cell 10 (e.g., adjusting the dimensions of matrix body 12 and/or inclusion body 14). In one example, longer wavelengths of electromagnetic radiation may be reflected using larger unit cells of the narrow band filter.

Figure 18:
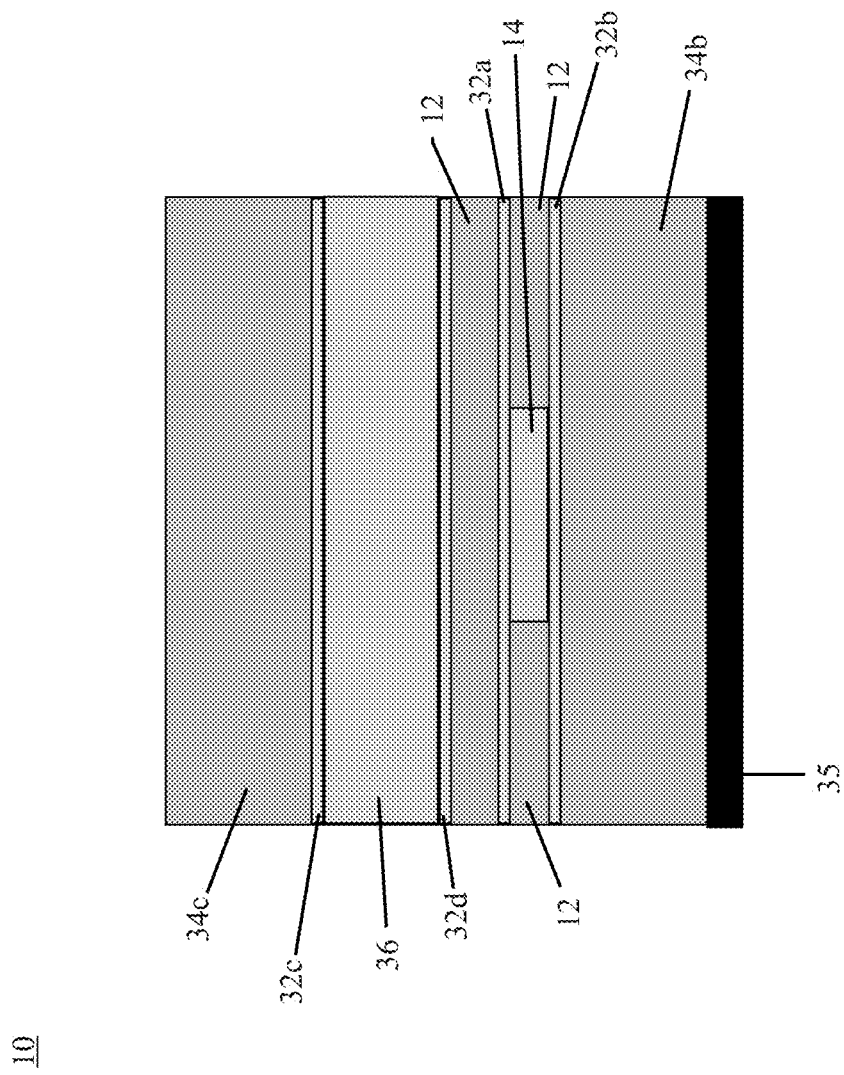
FIG. 18 illustrates a side view of the unit cell, in accordance with various aspects of the subject technology.

FIG. 18 illustrates a side view of unit cell 10, in accordance with various aspects of the subject technology. As shown, electrodes 32c and 32d and liquid crystal 36 are disposed between substrates 34c and matrix body 12. Inclusion body 14 is disposed within matrix body 12 and is coupled between electrodes 32a and 32b. Substrate 34b is disposed between electrode 32b and absorber coating 35. Electrodes 32a, 32b, 32c, and 32d may be used for applying voltage across liquid crystal 36 as well as inclusion body 14, which may also be a liquid crystal. In such a configuration, the bandwidth of the reflected electromagnetic radiation in addition to the center of wavelength of the reflected electromagnetic radiation may be adjusted by adjusting an amount of voltage applied across liquid crystal 36 and/or inclusion body 14.

Figure 19:
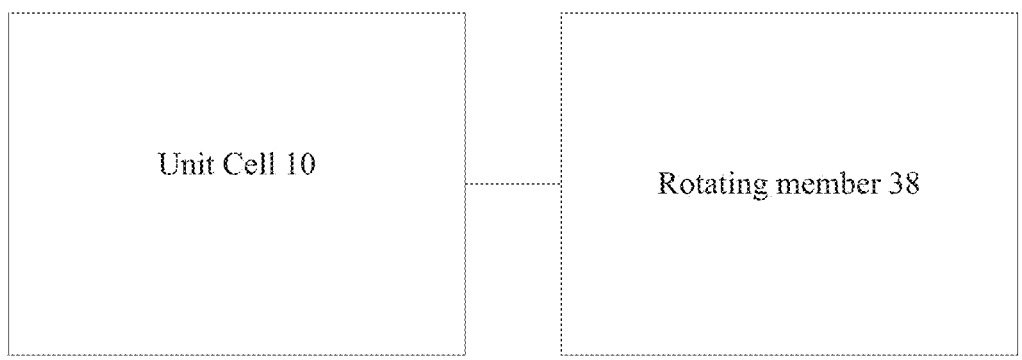
FIG. 19 is a block diagram of a narrow band filter, in accordance with various aspects of the subject technology.

According to various aspects of the subject technology, unit cell 10 of narrow band filter may be rotated in various orientations for different functions. FIG. 19 is a block diagram of narrow band filter 40, in accordance with various aspects of the subject technology. Narrow band filter 40 comprises unit cell 10 and rotating member 38. In some aspects, rotating member 38 is configured to rotate unit cell 10. Rotating member 38 may be any suitable rotating means for rotating unit cell 10. For example, narrow band filter 40 and/or unit cell 10 may be mounted on a rotating stage, rotated by rotating member 38.

In some aspects, rotating member 38 is configured to rotate unit cell 10 about an axis perpendicular to ERFS 28 of inclusion body 14. In some aspects, rotating member 38 is configured to rotate unit cell 10 about an axis parallel to ERFS 28 of inclusion body 14.

Figure 20:
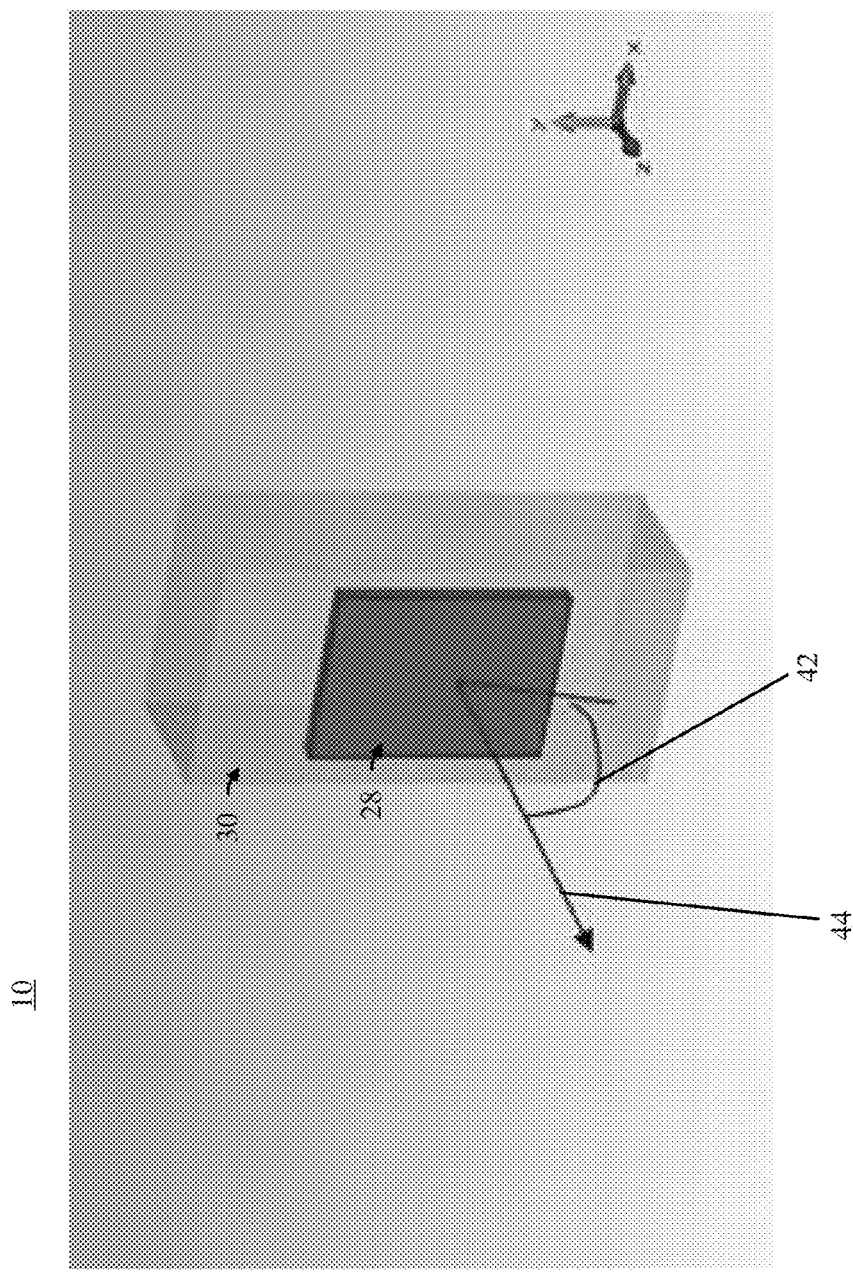
FIG. 20 illustrates a perspective view of the unit cell, in accordance with various aspects of the subject technology.
Figure 21:
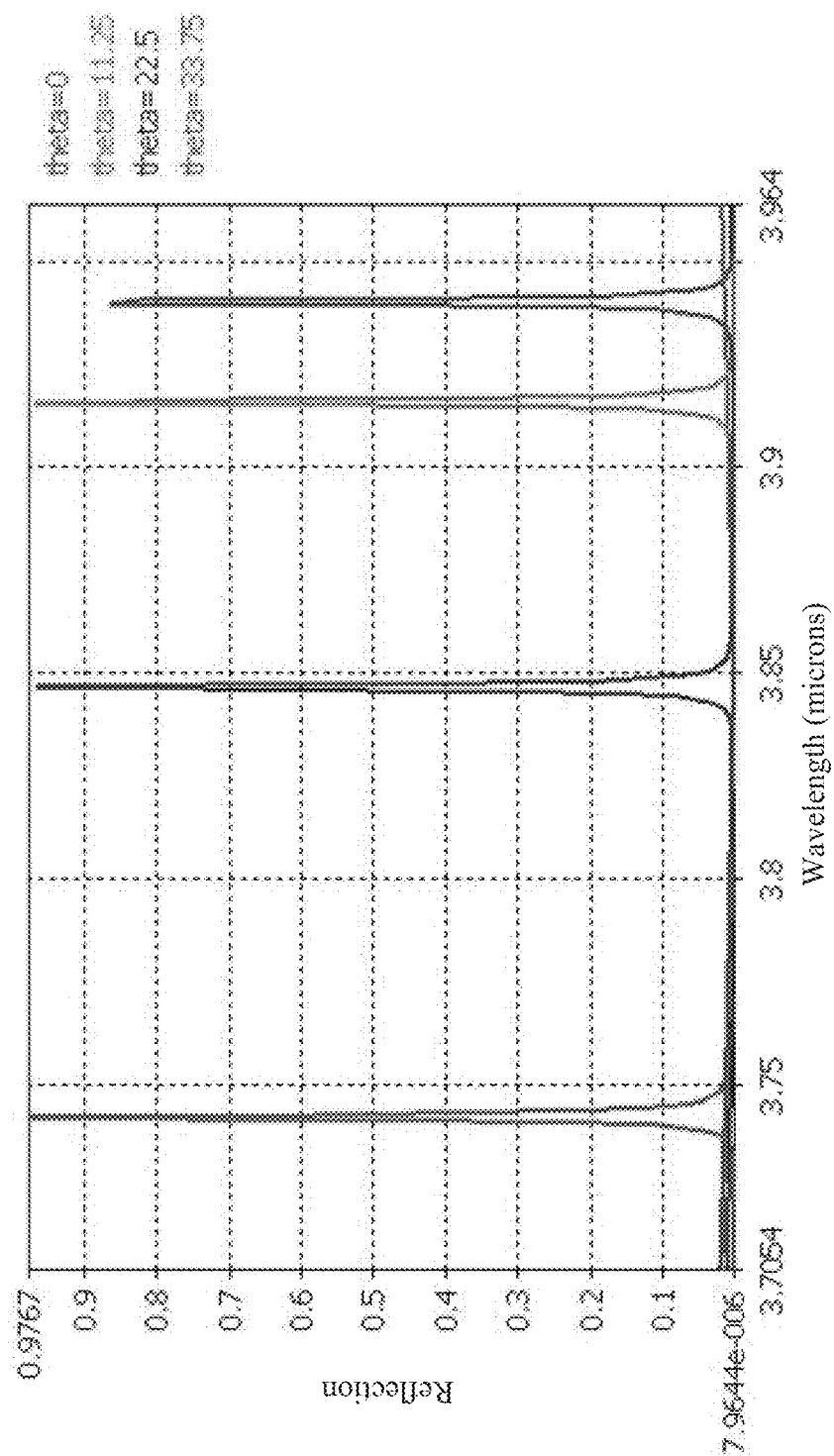
FIG. 21 illustrates examples of the spectral response of the reflected electromagnetic radiation of the unit cell, in accordance with various aspects of the subject technology.

FIG. 20 illustrates a perspective view of unit cell 10, in accordance with various aspects of the subject technology. The center of wavelength of the reflected electromagnetic radiation may be adjusted by varying an angle of incidence of the electromagnetic radiation. For example, axis 44 is normal to ERFS 28 of inclusion body 14 as shown in FIG. 20. By varying the angle of incidence of the electromagnetic radiation from normal to off-normal, as indicated by angle 42, the center of wavelength may be shifted accordingly. Thus, in some aspects, the center of wavelength may be shifted by rotating unit cell 10 using rotating member 38 about an axis parallel to ERFS 28 of inclusion body 14. FIG. 21 illustrates examples of the spectral response of the reflected electromagnetic radiation of unit cell 10, in accordance with various aspects of the subject technology. The values for theta represent angle 42. As shown in FIG. 21, as theta is increased, the center of wavelength is shifted to the left.

According to various aspects of the subject technology, narrow band filter 40 may be polarization dependent or polarization independent. In some aspects, narrow band filter 40 may be configured to provide a same spectral response to transverse electric (TE) mode radiation as transverse magnetic (TM) mode radiation (e.g., making narrow band filter 40 polarization independent). For example, unit cell 10 may be rotated (e.g., using rotating member 38) about an axis perpendicular to ERFS 28 of inclusion body 14 such that unit cell 10 reflects TE mode radiation in a similar manner as TM mode radiation. Unit cell 10 may be rotated about the axis perpendicular to ERRS 28 by 90 degrees to achieve such a result. In some aspects, narrow band filter 40 may comprise a first unit cell and a second unit cell, either one of which may operate similarly as unit cell 10. The first unit cell may be oriented about 90 degrees with respect to the second unit cell about an axis perpendicular to an ERFS of the first unit cell and an ERFS of the second unit cell. Doing so may allow narrow band filter 40 to be polarization independent. Furthermore, in some aspects, a polarization beam splitter may be used to split incoming electromagnetic radiation into TM mode radiation and TE mode radiation, a half waveplate may be used to perform a 90 degree shift on the TM mode radiation or the TE mode radiation, and the TM mode radiation and the TE mode radiation may be rejoined after being reflected by narrow band filter 40.

Figure 22A:
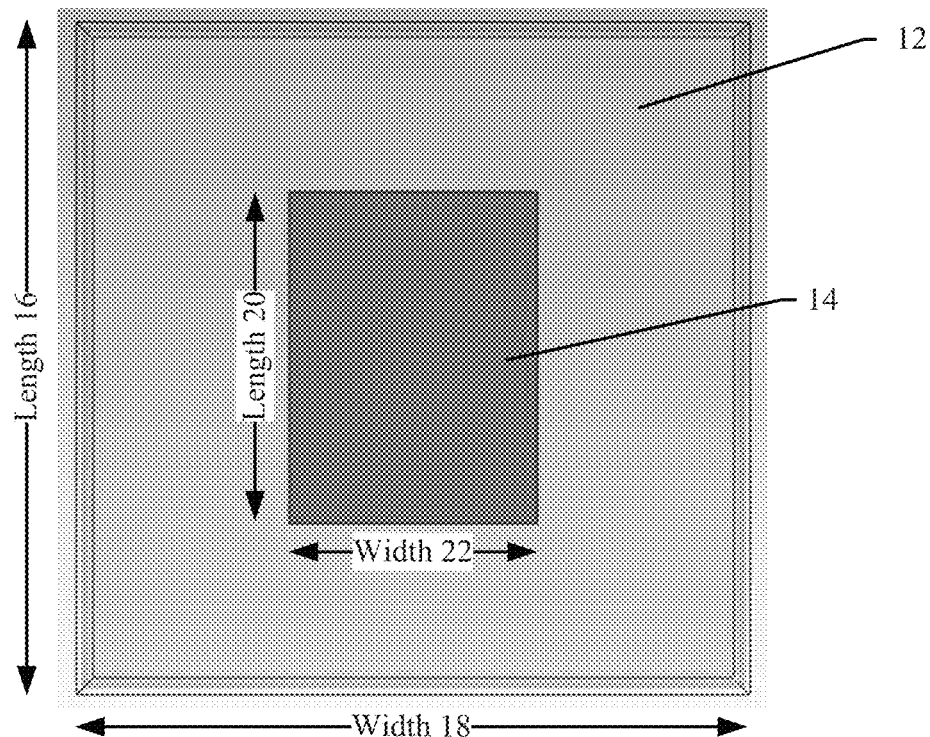
Figure 22B:
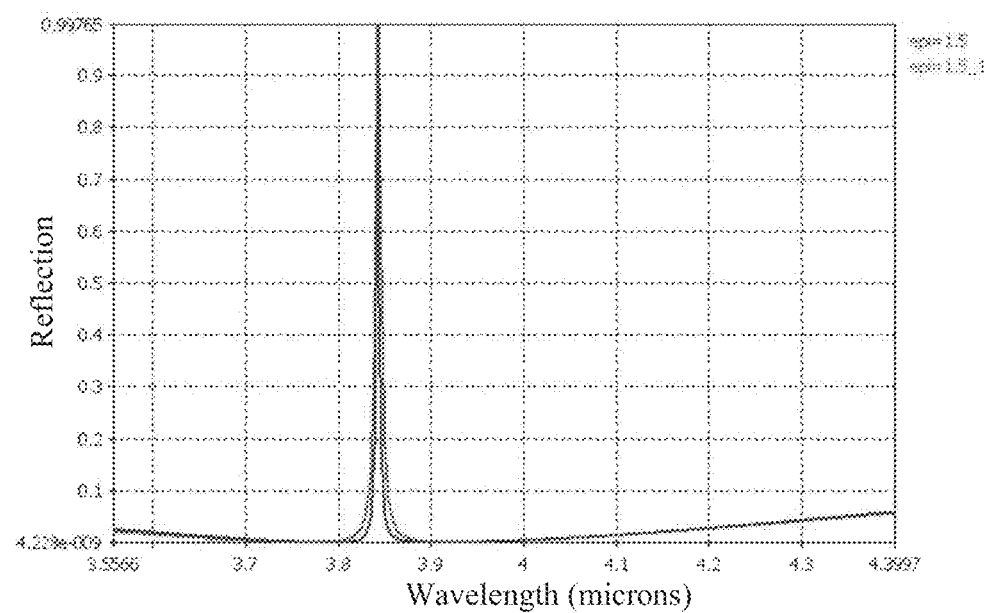
FIG. 22B illustrates an example of the spectral response of the reflected electromagnetic radiation of the unit cell of FIG. 22A, in accordance with various aspects of the subject technology.

FIG. 22A illustrates an example of a polarization independent unit cell configuration for narrow band filter 40, in accordance with various aspects of the subject technology. Length 16 and width 18 of matrix body 12 may be the same. For example, length 16 and width 18 may be 3.04 microns. Length 20 of inclusion body 14 may be 1.52 microns. Width 22 of inclusion body 14 may be 1.14 microns. FIG. 22B illustrates an example of the spectral response of the reflected electromagnetic radiation of unit cell 10 of FIG. 22A, in accordance with various aspects of the subject technology. The inner curve represents TE mode radiation while the outer curve represents TM mode radiation. As shown in FIG. 22B, the spectral responses for both TE mode radiation and TM mode radiation are substantially the same.

Figure 23:
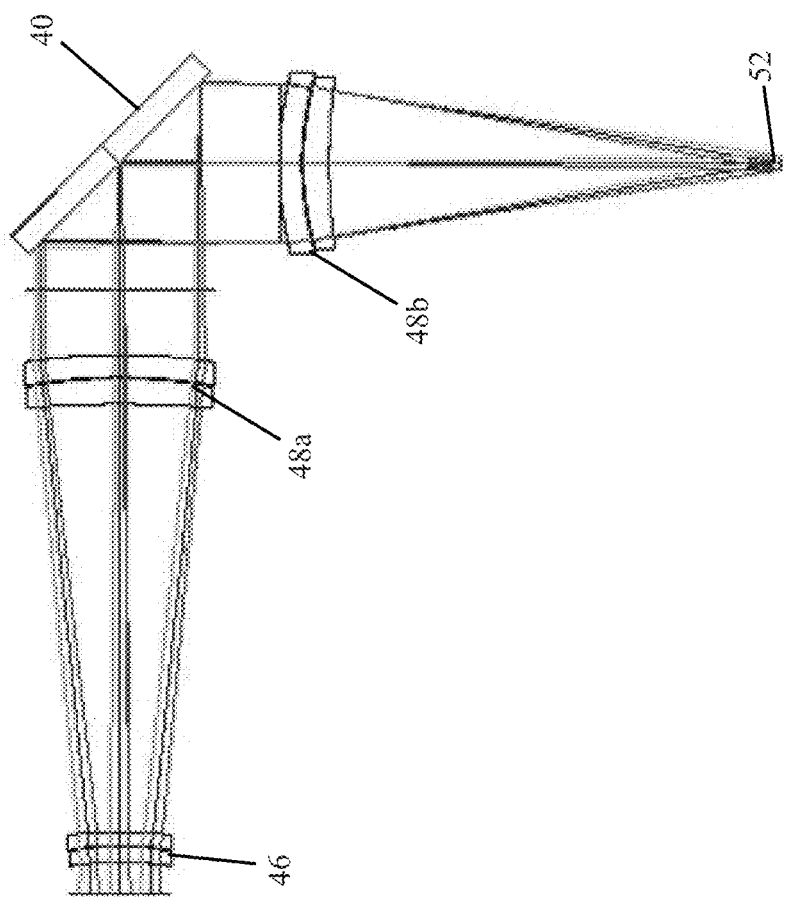
FIG. 23 illustrates an example of a narrow band filter system utilizing the narrow band filter for standoff chemical detection, in accordance with various aspects of the subject technology.

FIG. 23 illustrates an example of a narrow band filter system 50 utilizing narrow band filter 40 for standoff chemical detection, in accordance with various aspects of the subject technology. Narrow band filter system 50 comprises narrow band filter 40, transmissive optics 48a and 48b (e.g., lenses), and detector 52 with cold shield. In some aspects, specific bands of electromagnetic radiation from the sun may be absorbed by chemical species of interest at a standoff distance, such as a standoff distance of about 100 feet. Using the afocal telescope design as shown in FIG. 23, electromagnetic radiation may enter telescope entrance pupil 46 and travel through transmissive optics 48a, and may then be reflected off narrow band filter 40. A narrow band of electromagnetic radiation may then travel through transmissive optics 48h to detector 52 with cold shield. In some aspects, the tunable narrow band may sweep tens of spectral bands of interest. Chemometrics based software may be used for data collected to determine mixed chemical compositions by de-convolving overlapping spectral lines. Some applications of narrow band filter 40 include fence line monitoring to protect industrial releases, fugitive emissions, high traffic area monitoring, CWA emissions, standoff detection, and other suitable applications.

As an example, standoff detection may be implemented with narrow band filter 40 using validated hyperspectral system performance modeling codes and electro-optics systems modeling. For a covert operations scenario in which chemical detection is performed from a 50 meter tower looking down at a 45 degree angle, systems modeling shows that with a 2 nm bandwidth of reflected electromagnetic radiation and a sampling of 20 bands over an integration time of 0.1 seconds, a Formaldehyde signature can be identified with a minimum detection quantity of 57.5 ppm*m, which is suitable for standoff detection.

In some aspects, a chemical detection demonstration at a standoff distance of 2 meters may be performed using vapor generated from a sample of ammonium nitrate, formaldehyde and a common solvent, which are often present in homemade explosives. The highest gas concentration may be located directly at the solid-gas or liquid-gas interface above the sample. The resulting gas mixture may be excited by a Xenon source to simulate the sun, which tails into the infrared. Narrow band filter 40 may be integrated with an ImageIR camera with a sufficient frame rate needed for the demonstration. Narrow band filter 40 may sweep up to 50 spectral bands from 3.8 microns to 4.2 microns. Data collected may use chemometrics based software to determine mixed chemical compositions by de-convolving overlapping spectral lines. The subject technology may be used to address specific clandestine reactants and solvents of interest.

Some approaches do not allow for tunability in the infrared range. Non-tunable narrow band filters in the infrared range, for example, have a maximum resolution of approximately 1 nm. According to various aspects of the subject technology, an order of magnitude improvement is provided over such approaches. According to one approach, a tunable bi-refringent uses solar physics that requires 300 parts, some of which are moving. In accordance with various aspects of the subject technology, this approach may be replaced with a light weight, compact tunable filter system without moving parts. In some aspects, this filter may operate in the visible range.

In some aspects, areas where narrow band filter 40 may be utilized include space and solar physics, improvised explosion detection, chemical warfare agent detection, toxic industrial chemical detection, monitoring of green house gas emission, and small low power gas specific sensors. In some aspects, narrow band filter 40 may use low power (e.g., a few volts to modulate the permittivity of the liquid crystal), may be compact and low weight (e.g., net thickness of narrow band filter 40 may be approximately 6 mm while the lateral dimensions may depend on the aperture of the optical system), and may be suitable for high power applications (e.g., the liquid crystal and an all-dielectric photonic crystal layer can be made from laser harden materials).

FIG. 24 illustrates an example of method 2400, in accordance with various aspects of the subject technology. Method 2400 comprises reflecting electromagnetic radiation incident on an electromagnetic radiation facing surface of a matrix body of a unit cell of a narrow band filter and an electromagnetic radiation facing surface of an inclusion body of the unit cell of the narrow band filter. The inclusion body is disposed in the matrix body. The matrix body has a first permittivity. The inclusion body has a second permittivity. A bandwidth of the reflected electromagnetic radiation is based on a difference between the first permittivity and a third permittivity. The third permittivity is an average permittivity between the first permittivity and the second permittivity based on a volume of the inclusion body and a volume of a portion of the matrix body. The portion of the matrix body is adjacent to and/or opposite the electromagnetic radiation facing surface of the inclusion body. Method 2400 also comprises adjusting the second permittivity of the inclusion body to adjust the third permittivity, thereby adjusting the difference between the first permittivity and the third permittivity. In some aspects, method 2400 comprises rotating the unit cell about an axis perpendicular to the electromagnetic radiation facing surface of the inclusion body. In some aspects, method 2400 comprises rotating the unit cell about an axis parallel to the electromagnetic radiation facing surface of the inclusion body.

FIG. 25 illustrates the filter system 100, in accordance with various aspects of the subject technology. In some aspects, an incoming light 110 my comprise a narrowband light such as a laser light. In other aspects, the incoming light 110 may comprise light at an infrared wavelength, visible wavelength, and/or other suitable wavelengths.

According to various aspects of the subject technology, the filter system 100 may comprise a fixed filter 130 configured to pass a portion of the incoming light 110 from the tunable filter 120 within a second band 132. In some aspects, the fixed filter 130 may be configured to reflect any light from the tunable filter 120 outside of the second band 132 of the fixed filter 130. For example, the incoming light 110 may consist of a very narrowband (e.g., a laser light) with an individual spectra 115. In this example, the incoming light 110 enters the filter system 100, passes through the tunable filter 120 with a transmission spectra 125, then passes through the fixed filter 130 with a transmission spectra 135, and exits the filter system 100 as an output light 140. The tunable filter 120 attenuates a portion of the incoming light 110 that is transmitted within the first band 122 while transmitting all other light. The fixed filter 130 passes a portion of the light transmitted by the tunable filter 120 that is within the second band 132, and reflects any light from the tunable filter 120 that is outside of the second band 132. In some aspects, the tunable filter 120 may act as a narrowband filter whose peak attenuation wavelength 128 can be adjusted to coincide with the incident light or not, and therefore attenuate the incident light by a controllable amount. In some aspects, the fixed filter 130 may be a wider bandpass filter that may block any other scene light outside of the wavelengths of interest.

Figure 26A:
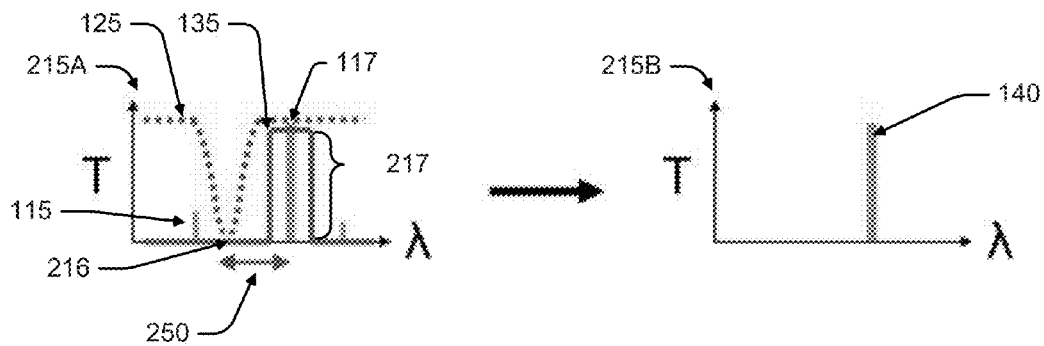
FIGS. 26A-26C illustrate examples of a spectra of an incoming light and a transmission spectrum of a tunable filter and a fixed filter, in accordance with various aspects of the subject technology.
Figure 26B:
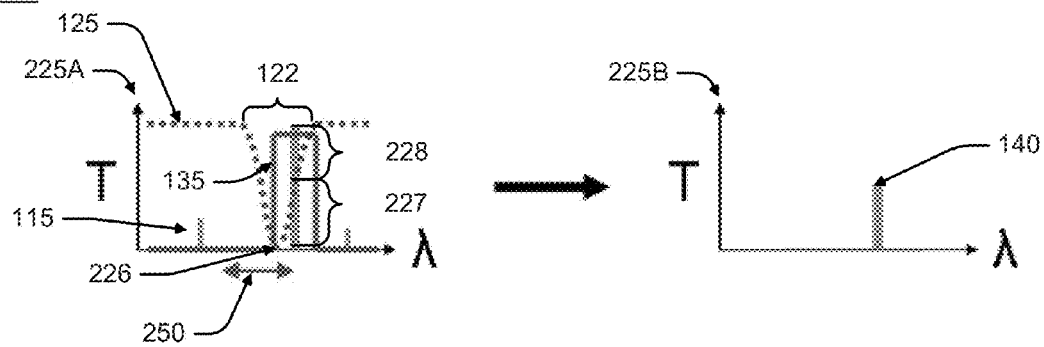
Figure 26C:
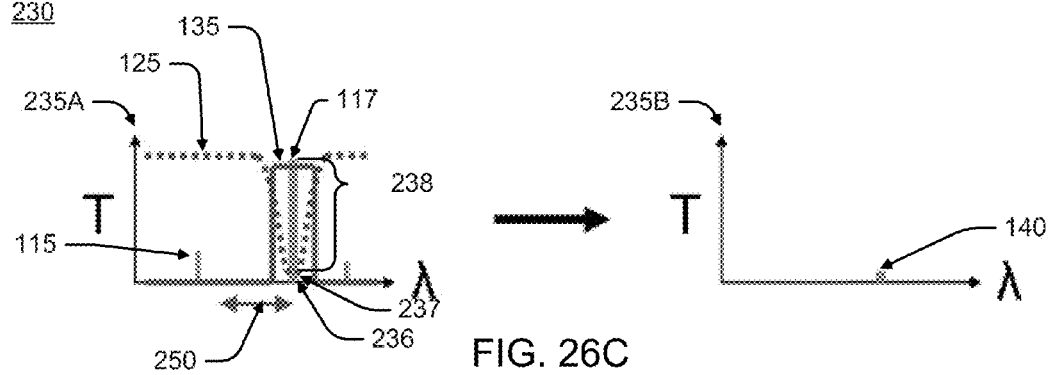

FIGS. 26A-26C illustrate examples of a spectra 115 of an incoming light 110, a transmission spectrum 125 of the tunable filter 120, and a transmission spectrum 135 of the fixed filter 130, in accordance with various aspects of the subject technology. The incoming light 110 includes a wavelength of interest 117. The spectra 115 of the incoming light 110, the transmission spectrum 125 of the tunable filter 120, and the transmission spectrum 135 of the fixed filter 130, are overlaid on the same plots 215A, 225A, and 235A. Plots 215B, 225B, and 235B illustrate the magnitude of the output light 140 from the filter system 100. As illustrated in examples 210, 220, and 230, the peak attenuation wavelength of the tunable filter 120 may be adjusted 250 such that the total transmission for the incoming light 110 may be reduced to the output light 140. In some aspects, the bandwidth of the tunable filter 120 and the bandwidth of the fixed filter 130 may be configured such that their combination meets a specific requirement for wavelength rejection of a particular application.

In FIG. 26A, the tunable filter 120 is tuned to a first peak attenuation wavelength 216 that does not coincide with the wavelength of interest 117 of the incoming light 110. As a result, the tunable filter 120 does not attenuate the wavelength of interest 117. The fixed filter 130 is configured to pass a portion of the incoming light 217 within the second band of the fixed filter 130. The filter system 100 thereby transmits the output light 140, in which the wavelength of interest 117 is not attenuated as shown in plot 215B.

In FIG. 26B, the tunable filter 120 is tuned to a second peak attenuation wavelength 226 located near the wavelength of interest 117. As a result, the first band 122 overlaps the wavelength of interest 117 and therefore attenuates a portion of the incoming light 228. In this example, the wavelength of interest 117 may be attenuated by a greater amount by tuning the filter 120 to move the peak attenuation wavelength 226 closer to the wavelength of interest 117. Conversely, the wavelength of interest 117 may be attenuated by a lesser amount by tuning the filter 120 to move the peak attenuation wavelength 226 away from the wavelength of interest 117. The fixed filter 130 is configured to pass a portion of the incoming light 227 within the second band of the fixed filter 130. The filter system 100 thereby transmits the output light 140, as shown in plot 225B.

In FIG. 26C, the tunable filter 120 is tuned to a third peak attenuation wavelength 236 that coincides with the wavelength of interest 117. As a result, the tunable filter 120 attenuates a large portion of the incoming light 238. The fixed filter 130 is configured to pass a portion of the incoming light 237 within the second band of the fixed filter 130. The filter system 100 thereby transmits the output light 140, as shown in plot 235B.

Figure 27A:
FIGS. 27A-27C illustrate examples of a spectra of an incoming light and a transmission spectra of a tunable filter, in accordance with various aspects of the subject technology.
Figure 27B:
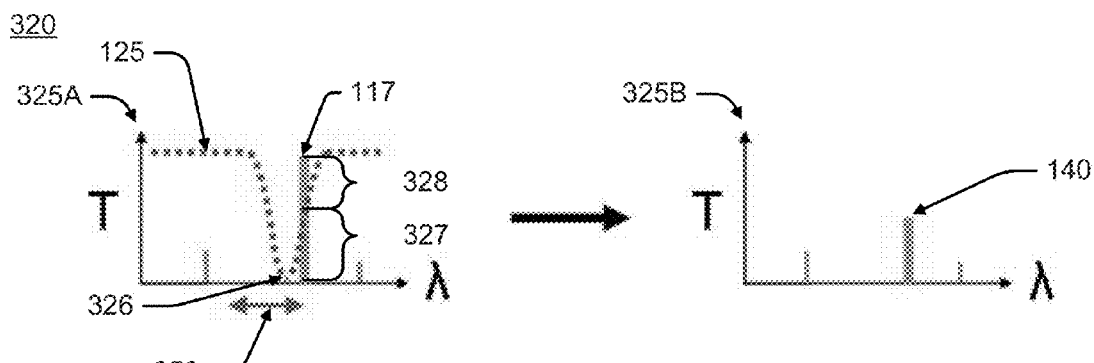
Figure 27C:
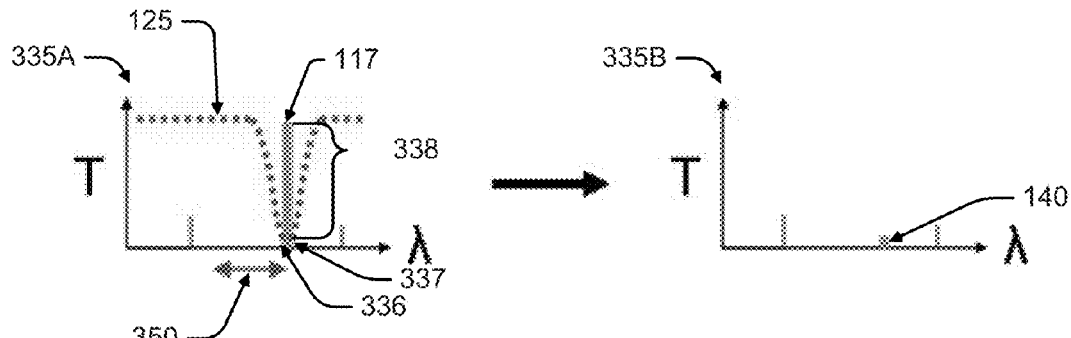

In some aspects, the fixed filter 130 may be removed from the filter system 100. FIGS. 27A-27C illustrate examples of a spectra 115 of an incoming light 110 and a transmission spectra 125 of a tunable filter 120 in accordance with various aspects of the subject technology. In these examples, the output 140 of the filter system 100 is the light transmitted by the tunable filter 120. The spectra 115 of the incoming light 110 and the transmission spectra 125 of the tunable filter 120 are overlaid on the same plots 315A, 325A, and 335A. Plots 315B, 325B, and 335B illustrate the magnitude of the output light 140 from the filter system 100. As illustrated in examples 310, 320, and 330, the peak attenuation wavelength of the tunable filter 120 may be adjusted 350 such that the total transmission for the incoming light 110 may be reduced to the output light 140.

In FIG. 27A, the tunable filter 120 is tuned to a first peak attenuation wavelength 316 that does not coincide with the wavelength of interest 117 of the incoming light 110. As a result, the tunable filter 120 does not attenuate the wavelength of interest and therefore transmits the output light 140, as shown in plot 315B.

In FIG. 27B, the tunable filter 120 is tuned to a second peak attenuation wavelength 326 that is located near the wavelength of interest 117. As a result, the first band overlaps the wavelength of interest, and therefore attenuates a portion of the incoming light 328 corresponding to the wavelength of interest 117 and passes a portion of the incoming light 327. The filter system thereby transmits the output light 140, as shown in plot 325B.

In FIG. 27C, the tunable filter 120 is tuned to a third peak attenuation wavelength 336 that coincides with the wavelength of interest. As a result, the tunable filter 125 attenuates a large portion of the incoming light 338 corresponding to the wavelength of interest 117 and passes a small portion of the incoming light 337. The filter system thereby transmits the output light 140, as shown in plot 335B.

Figure 28:
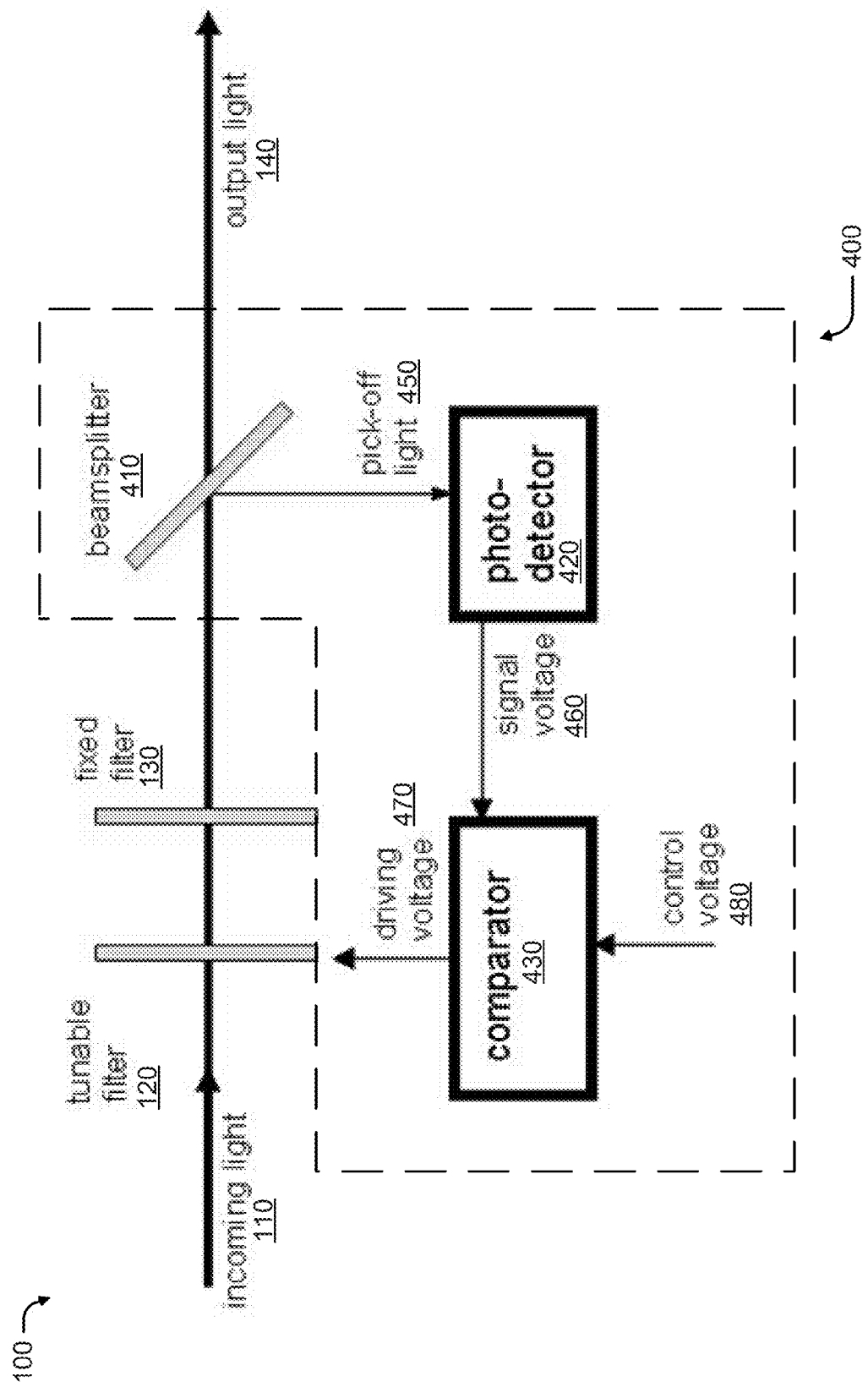
FIG. 28 illustrates an example of a feedback loop, in accordance with various aspects of the subject technology.

FIG. 28 illustrates an example of the filter system comprising a feedback loop 400, in accordance with various aspects of the subject technology. According to certain aspects, the output light 140 of the filter system 100 may be precisely controlled by use of the feedback loop 400. The feedback loop 400 comprises a beamsplitter 410, a photo detector 420, and a comparator 430.

A portion of the output light, referred to as a pick-off light 450, may be diverted via the beamsplitter 410, disposed between the fixed filter 130 and the filter system output. The beamsplitter 410 may direct the pick-off light 450 onto the photo detector 420, which measures the magnitude of the light. For example, the detector 420 may comprise a photo detector 420, configured to generate a detection signal, referred to as a signal voltage 460, based on a magnitude of the pick-off light 450 directed to the detector 420.

The photo detector 420 transmits the signal voltage 460 to a comparator 430, which compares the signal voltage 460 with a control voltage 480. In one aspect, the comparator 430 may be configured to tune the peak attenuation wavelength of the tunable filter 120 based on the comparison such that the difference between the signal voltage 460 and the control voltage 480 is reduced. In this aspect, the comparator 430 may be configured to tune the peak attenuation wavelength by modulating a driving voltage 470 that controls the peak attenuation wavelength of the tunable filter 120. In some aspects, the feedback loop 400 may improve the precision of the filter system 100 by matching the peak attenuation wavelength of the tunable filter to the peak wavelength 117 of the incoming light 110. In other aspects, the feedback loop 400 may enable the filter system 100 to maintain an extremely precise magnitude of output light 140 by tuning the peak attenuation wavelength closer to or further from the wavelength of the incoming light such that its magnitude is attenuated by a precise amount.

Figure 29:
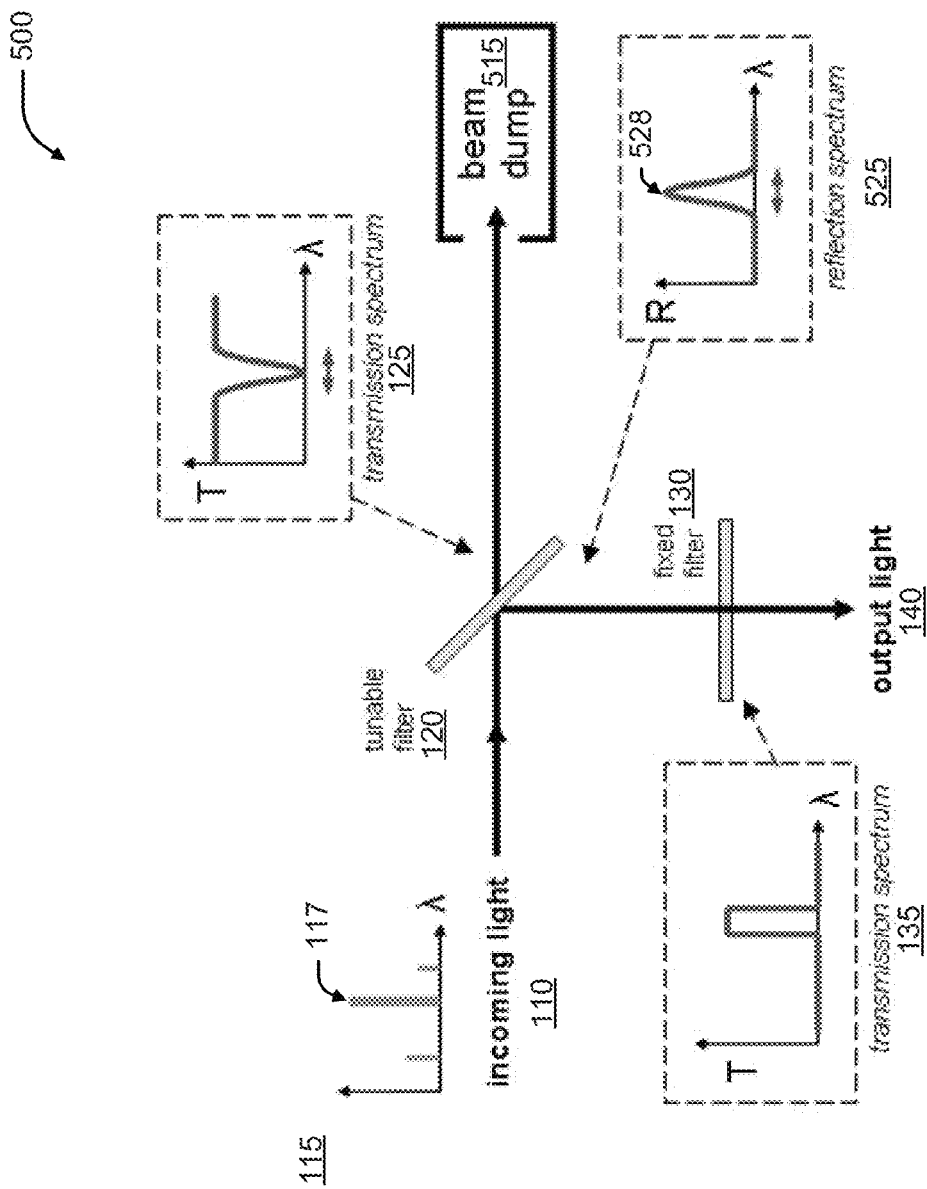
FIG. 29 illustrates a filter system, in accordance with various aspects of the subject technology.

In some aspects, a filter system 500 may be configured to use a reflected light from the tunable filter 120. Referring to FIG. 29, the filter system 500 may comprise the tunable filter 120 configured to transmit and reflect the incoming light 110 according to a transmission spectra 125 and reflection spectra 525, respectively. The light transmitted by the tunable filter 120 may be absorbed by a beam dump 515. The beam dump 515 may comprise an absorbing enclosure such as a closed dark box configured to capture the transmitted light.

The light reflected by the tunable filter 120 may pass through the fixed filter 130 having a transmission spectra 135 as described above. For example, the incoming light 110 may consist of a very narrowband light with an individual spectra 115 and having a wavelength of interest 117. In this example, the incoming light 110 enters the filter system 500 to the tunable filter 120 with a transmission and reflection spectrum 125 and 525, respectively. The light transmitted by the tunable filter 120 is absorbed by the beam dump 515. The light reflected by the tunable filter 120 passes through the fixed filter 130 with a transmission spectra 135, and exits the filter system 100 as an output light 140. The tunable filter 120 thereby transmits a portion of the incoming light 110 within the transmission spectra 125 while reflecting a portion of the light within the reflection spectra 525. The fixed filter 130 passes a portion of the incoming light 110 reflected by the tunable filter 120 that is within the transmission spectra 135, and reflects any light from the tunable filter 120 that is outside of the transmission spectra 135. The filter system 500 may therefore act as a narrowband filter whose peak wavelength can increase or decrease to coincide or not with that of incident light, and therefore attenuates via a reflection a portion of the incident light by a controllable amount.

For example, attenuation of the incident light may be increased by moving the peak wavelength 528 of the reflection spectrum 525 away from the wavelength of interest 117 of the incident light. Conversely, attenuation of the incident light may be decreased by moving the peak wavelength 528 of the reflection spectrum 525 closer to the wavelength of interest 117 of the incident light.

According to some aspects of the subject technology, the filter system 100 may be used to reduce the brightness of the incoming light 110 of a particular wavelength. In one aspect, the filter system 100 may be used as a component within an imaging system. In this application, the filter system 100 may enable the imaging system to achieve a wide dynamic range in a bright scene in real time. To achieve this, the filter system may be used to reduce the brightness of the incoming light 110 of a particular wavelength that is so bright that it obscures dimmer light at nearby wavelengths. In this application, the filter system 100 may control or entirely remove the contribution of the bright wavelength to the image, allowing the image to consist only of light of the desired dimmer wavelengths.

The filter system 100 may have extremely sharp cut-ons and cut-offs in its transmission spectrum due to its metamaterial-based component, enabling fine differentiation of wavelengths that are very close together. In some aspects, the filter system bandpass may be as small as 0.2 nanometers. This sharpness enables solutions in applications that have undesirable illumination properties, i.e., incoming light may have a particular wavelength that is so bright that it obscures dimmer light of interest at nearby wavelengths. A specific example of this application may be a fluorescence imaging application, where an object may be illuminated with a bright laser source and the object fluoresces dimly in different wavelengths. In this case, a desirable imaging system that views the object may comprise the filter system 100 that may be used to eliminate the laser light while allowing the desired wavelengths to pass unattenuated.

In some aspects, the filter system 100 may be used to quickly and automatically control the output light 140 of an extremely bright laser source without using any moving parts. For example, the filter system 100 may be used in a damage reduction system, such as a laser safety system, to quickly shut down the output light 140 of an extremely bright laser source. The filter system 100 may be triggered by some external signal, for example, from a detector that senses that there is too much light at some location, or from an unauthorized personnel access alarm.

In some aspects, the filter system 100 is compact, robust, reliable and uses low electrical power, due to the absence of any moving parts. In these aspects, the filter system 100 may be used as a method for attenuating particular wavelengths in extreme environments such as space. In comparison to a conventional filter wheel, the filter system 100 may occupy a minimal volume and consume minimal power. Accordingly, the filter system 100 may be used in an environment requiring low-volume, low-power, ruggedness and high reliability.

In some aspects, the filter system may be used in various markets, including for example and without limitation, advanced sensors, optical components, laser safety systems, biological research components, and space flight components markets.

Figure 30:
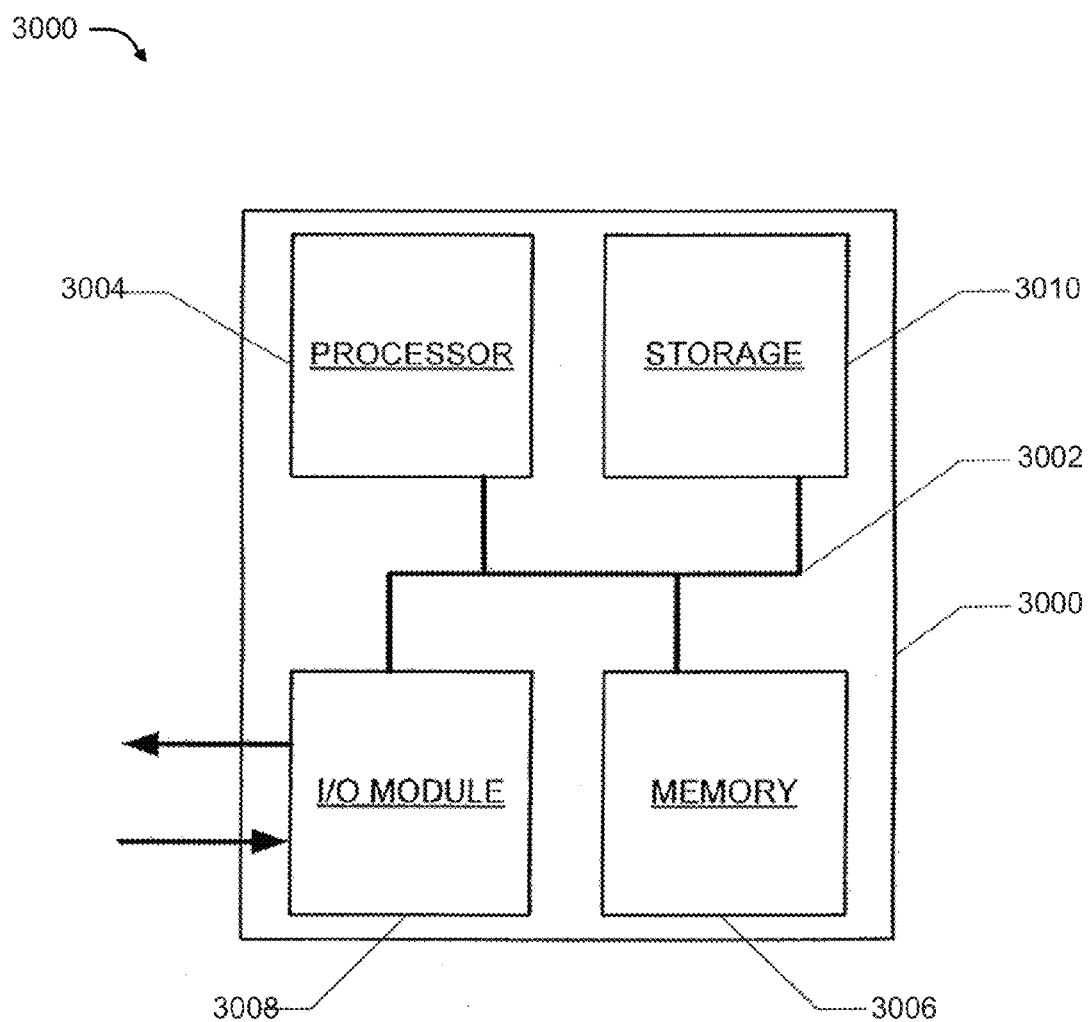
FIG. 30 is a block diagram illustrating components of a controller, in accordance with various aspects of the subject technology.

The electrical functions of the subject technology may be managed by a controller. FIG. 30 is a block diagram illustrating components of a controller 3000, in accordance with various aspects of the subject technology. Controller 3000 comprises processor module 3004, storage module 3010, input/output (I/O) module 3008, memory module 3006, and bus 3002. Bus 3002 may be any suitable communication mechanism for communicating information. Processor module 3004, storage module 3010, I/O module 3008, and memory module 3006 are coupled with bus 3002 for communicating information between any of the modules of controller 3000 and/or information between any module of controller 3000 and a device external to controller 3000. For example, information communicated between any of the modules of controller 3000 may include instructions and/or data. In some aspects, bus 3002 may be a universal serial bus. In some aspects, bus 302 may provide Ethernet connectivity.

In some aspects, processor module 3004 may comprise one or more processors, where each processor may perform different functions or execute different instructions and/or processes. For example, one or more processors may execute instructions for controlling an amplitude of an incoming light by tuning the peak attenuation wavelength of the tunable filter 120, one or more processors may execute instructions for generating a detection signal based on the portion of the incoming light directed to a detector, one or more processors may execute instructions for comparing the detection signal with a control signal, one or more processors may execute instructions for tuning the peak attenuation wavelength of the tunable filter 120 based on the comparison, and one or more processors may execute instructions for input/output functions.

Memory module 3006 may be random access memory ("RAM") or other dynamic storage devices for storing information and instructions to be executed by processor module 3004. Memory module 3006 may also be used for storing temporary variables or other intermediate information during execution of instructions by processor 3004. In some aspects, memory module 3006 may comprise battery-powered static RAM, which stores information without requiring power to maintain the stored information. Storage module 3010 may be a magnetic disk or optical disk and may also store information and instructions. In some aspects, storage module 3010 my comprise hard disk storage or electronic memory storage (e.g., flash memory). In some aspects, memory module 3006 and storage module 3010 are both a machine-readable medium.

Controller 3000 may be coupled via I/O module 3008 to a user interface for providing information to and receiving information from an operator of the filter system 100. For example, the user interface may be a cathode ray tube ("CRT") or LCD monitor for displaying information to an operator. The user interface may also include, for example, a keyboard or a mouse coupled to controller 3000 via I/O module 3008 for communicating information and command selections to processor module 3004.

According to various aspects of the subject disclosure, methods described herein are executed by controller 3000. Specifically, processor module 3004 executes one or more sequences of instructions contained in memory module 3006 and/or storage module 3010. In one example, instructions may be read into memory module 3006 from another machine-readable medium, such as storage module 3010. In another example, instructions may be read directly into memory module 3006 from I/O module 3008, for example from an operator of the filter system 100 via the user interface. Execution of the sequences of instructions contained in memory module 3006 and/or storage module 3010 causes processor module 3004 to perform methods for controlling an amplitude of an incoming light. For example, a computational algorithm for controlling the amplitude of the incoming light by tuning the peak attenuation wavelength of the tunable filter 120 may be stored in memory module 3006 and/or storage module 3010 as one or more sequences of instructions. Information such as the magnitude of the output light, the detection signal 460, and/or the driving voltage 470 may be communicated from processor module 3004 to memory module 3006 and/or storage module 3010 via bus 3002 for storage. In some aspects, the information may be communicated from processor module 3004, memory module 3006, and/or storage module 3010 to I/O module 3008 via bus 3002. The information may then be communicated from I/O module 3008 to an operator of the filter system 100 via the user interface.

One or more processors in a multi-processing arrangement may also be employed to execute the sequences of instructions contained in memory module 3006 and/or storage module 3010. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 3004 for execution. Such a medium may take many forms, including, but not limited to, non-volatile media, volatile media, and transmission media. Non-volatile media include, for example, optical or magnetic disks, such as storage module 3010. Volatile media include dynamic memory, such as memory module 3006. Transmission media include coaxial cables, copper wire, and fiber optics, including the wires that comprise bus 3002. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 31:
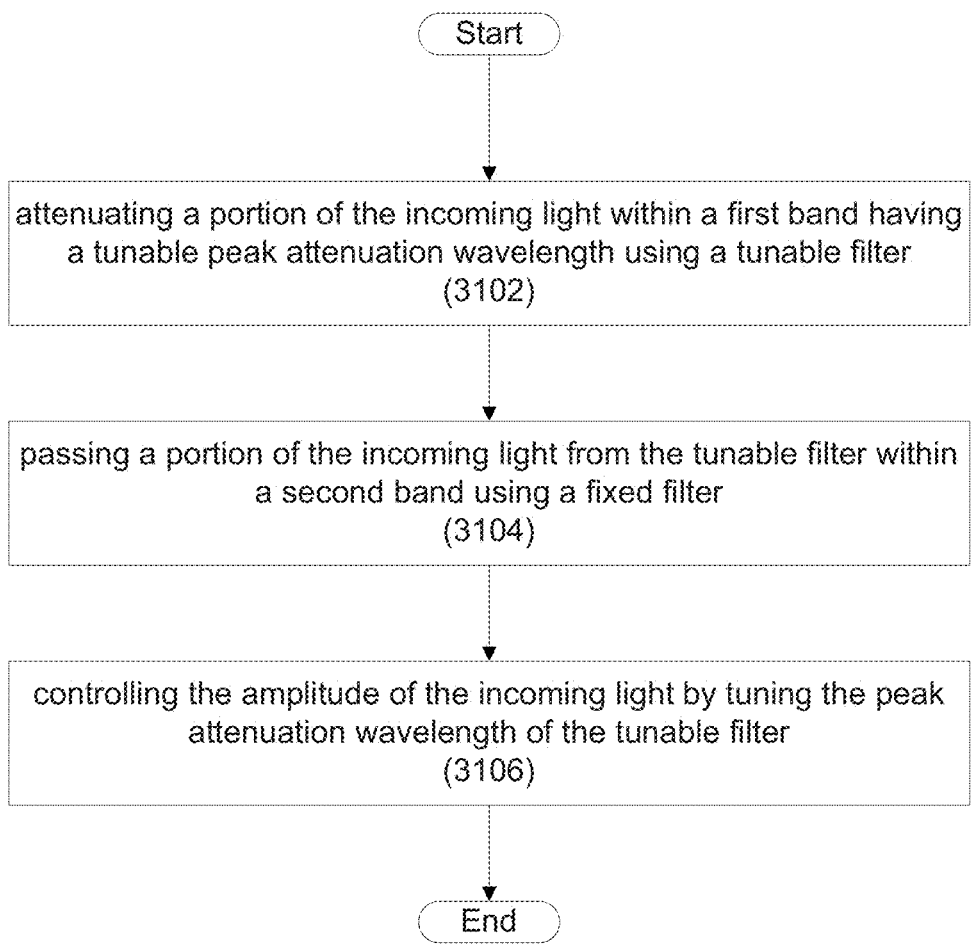
FIG. 31 illustrates an example of a method for controlling an amplitude of an incoming light, in accordance with various aspects of the subject technology.

FIG. 31 illustrates an example of a method 3100 for controlling an amplitude of an incoming light 110, in accordance with various aspects of the subject technology. Method 3100 comprises: attenuating a portion of the incoming light within a first band having a tunable peak attenuation wavelength using a tunable filter (3102); passing a portion of the incoming light from the tunable filter within a second band using a fixed filter (3104); and controlling the amplitude of the incoming light by tuning the peak attenuation wavelength of the tunable filter (3106).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A filter system, comprising:
   a tunable filter configured to attenuate via a transmission a portion of an incoming light within a first band having a tunable peak attenuation wavelength;
   a fixed filter configured to pass a portion of the incoming light from the tunable filter within a second band;
   a beamsplitter configured to receive and split the portion of the incoming light within the second band from the fixed filter;
   a detector configured to generate a detection signal based on a magnitude of the split portion of the incoming light directed to the detector by the beamsplitter; and
   a comparator configured to compare the detection signal with a control signal, and to provide a driving signal to the tunable filter for tuning the peak attenuation wavelength of the tunable filter based on the comparison of the detection signal with the control signal.

2. The system of claim 1, wherein the tunable filter comprises metamaterials, wherein the metamaterials are configured to have an arbitrary transmission as a function of wavelength.

3. The system of claim 1, wherein the tunable filter has no moving parts.

4. The system of claim 1, wherein the tunable filter is tunable in real time.

5. The system of claim 4, wherein the peak attenuation wavelength of the tunable filter is tuned in real time by varying a voltage applied to the tunable filter.

6. The system of claim 1, wherein the tunable filter is configured to attenuate a wavelength of interest of the incoming light by a controllable amount.

7. The system of claim 6, wherein the amount of attenuation of the wavelength of interest is controlled by moving the peak attenuation wavelength of the tunable filter relative to the wavelength of interest.

8. The system of claim 7, wherein the fixed filter is further configured to reflect any light from the tunable filter outside of the second band of the fixed filter.

9. A filter system, comprising:
   a tunable filter configured to attenuate via a reflection a portion of an incoming light within a first band having a tunable peak reflection wavelength; and
   a fixed filter configured to pass a portion of the incoming light from the tunable filter within a second band, wherein the amount of attenuation of the wavelength of interest is controlled by moving the peak reflection wavelength of the tunable filter relative to the wavelength of interest.

10. The system of claim 9, wherein the tunable filter is tunable in real time.

11. The system of claim 10, wherein the peak reflection wavelength of the tunable filter is tuned in real time by varying a voltage applied to the tunable filter.

12. The system of claim 9, wherein the tunable filter is configured to attenuate a wavelength of interest of the incoming light by a controllable amount.

13. A method for controlling an amplitude of an incoming light, the method comprising:
   attenuating a portion of the incoming light within a first band having a tunable peak attenuation wavelength using a tunable filter;
   passing a portion of the incoming light from the tunable filter within a second band using a fixed filter;
   comparing a control signal with a signal representative of a magnitude of the portion of the incoming light from the tunable filter within the second band; and
   controlling the amplitude of the incoming light by tuning the peak attenuation wavelength of the tunable filter based on the comparison.

14. The method of claim 13, wherein tuning the peak wavelength of the tunable filter comprises moving the peak wavelength relative to a wavelength of interest of the incoming light.

15. The method of claim 13, wherein the first filter has no moving parts.

16. The method of claim 13, wherein the first filter is tunable in real time.

* * * * *